United States Patent
Tachibana

(10) Patent No.: US 12,155,801 B2
(45) Date of Patent: Nov. 26, 2024

(54) APPARATUS, METHOD FOR CONTROLLING THE APPARATUS, AND STORAGE MEDIUM

(71) Applicant: CANON KABUSHIKI KAISHA, Tokyo (JP)

(72) Inventor: Yoshiro Tachibana, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/461,331

(22) Filed: Sep. 5, 2023

(65) Prior Publication Data

US 2023/0412745 A1  Dec. 21, 2023

Related U.S. Application Data

(63) Continuation of application No. 17/064,380, filed on Oct. 6, 2020, now Pat. No. 11,811,991.

(30) Foreign Application Priority Data

Oct. 11, 2019  (JP) .................. 2019-187545

(51) Int. Cl.
| | | |
|---|---|---|
| H04N 1/04 | (2006.01) | |
| B65H 29/14 | (2006.01) | |
| H04N 1/00 | (2006.01) | |
| H04N 1/387 | (2006.01) | |

(52) U.S. Cl.
CPC ........ *H04N 1/00718* (2013.01); *B65H 29/14* (2013.01); *H04N 1/0057* (2013.01); *H04N 1/0071* (2013.01); *H04N 1/3878* (2013.01)

(58) Field of Classification Search
USPC ...................................... 358/1.15, 1.12, 498
See application file for complete search history.

(56) References Cited

U.S. PATENT DOCUMENTS

2021/0112171 A1*  4/2021  Tachibana .......... H04N 1/00718

FOREIGN PATENT DOCUMENTS

| JP | 2006292777 A | 10/2006 |
|---|---|---|
| JP | 2010210666 A | 9/2010 |
| JP | 2012101900 A | 5/2012 |
| JP | 2012254856 A | 12/2012 |
| JP | 2013184821 A | 9/2013 |
| JP | 108124071 A | 6/2018 |
| JP | 108377306 A | 8/2018 |
| JP | 2019134278 A | 8/2019 |

* cited by examiner

Primary Examiner — Cheukfan Lee
(74) Attorney, Agent, or Firm — Canon U.S.A., Inc. IP Division

(57) ABSTRACT

In a case where a skew of a document being conveyed is detected by a detection unit, an image reading apparatus notifies that documents having different sheet widths may be included in documents stacked on a stacking unit.

30 Claims, 15 Drawing Sheets

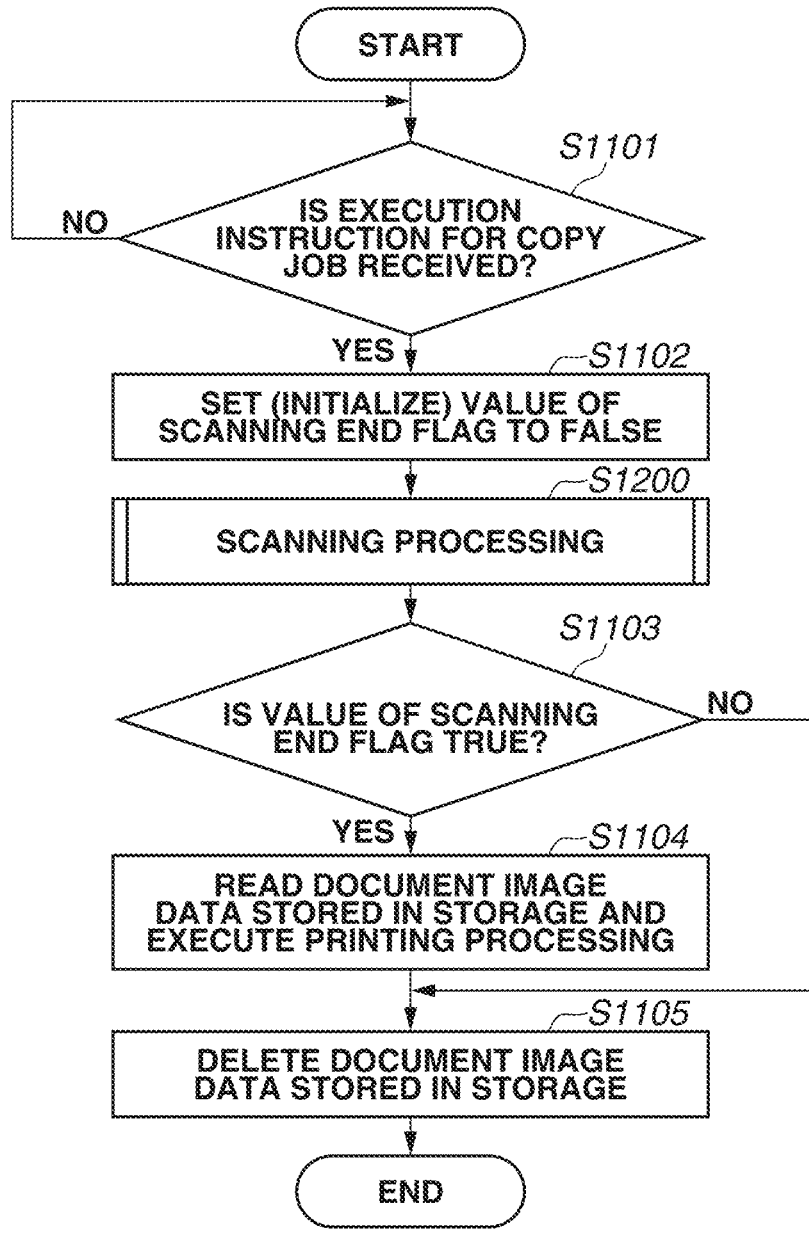

APPARATUS, METHOD FOR CONTROLLING THE APPARATUS, AND STORAGE MEDIUM

CROSS-REFERENCE TO RELATED APPLICATION

This application is a Continuation of U.S. application Ser. No. 17/064,380, filed Oct. 6, 2020, which claims priority from Japanese Patent Application No. 2019-187545, filed Oct. 11, 2019, which is hereby incorporated by reference herein in its entirety.

BACKGROUND OF THE DISCLOSURE

Field of the Disclosure

The aspect of the embodiments relates to an image reading apparatus that detects a skew of a document, a method for controlling the image reading apparatus, and a storage medium.

Description of the Related Art

There is provided an image reading apparatus that conveys a document through an auto-document feeder (ADF) to read an image of the document, and generates image data by reading the document. For such an image reading apparatus, if documents are stacked on a stacking unit (i.e., manual document feeding unit) with the documents skewed, a jam may occur while the document is being conveyed, which may damage a document. In addition, the jammed document may damage a roller inside the ADF and a nearby conveyance guide member. As a technique for solving the above-described issues, Japanese Patent Application Laid-Open No 2007-331908 discusses a printing apparatus that detects a skew of a document by two sensors arranged to be line-symmetrical to a conveyance direction, and adjusts a conveyance speed for the document conveyed by a conveyance roller based on a detected skewed amount.

As a method for detecting a skew of documents even for the documents having different sheet widths, a possible detection method is to provide several types of sensors arranged to be line-symmetrical to a conveyance direction of a document at different arrangement widths. By employing this method, for example, a skew of a document can be detected by the several types of sensors regardless of whether the document is an A2 size sheet or an A4 size sheet having a width narrower than that of the A2 size sheet.

However, the following issues arise when the several types of sensors are arranged. In a case where documents with different sheet widths mixed are stacked on a stacking unit, the sensors erroneously detect the different sheet widths as a skew of the documents, so that processing of reading the documents is interrupted. In such a case, unless the user is notified appropriately when the reading processing is interrupted, a cause of the interruption of the reading processing, i.e., a mixed state of the documents, cannot be resolved. Thus, the reading processing cannot be continuously executed no matter how much the user adjusts the document positions to prevent a skew of documents.

SUMMARY OF THE DISCLOSURE

According to an aspect of the embodiments, an apparatus includes a conveyance unit configured to convey a plurality of documents stacked on a stacking unit to a conveyance path, a reading unit configured to read a document conveyed by the conveyance unit, and a detection unit configured to detect, by using sensors, a skew of a document being conveyed. The sensors are arranged on a straight line intersecting with a conveyance direction of a document in the conveyance path. In a case where the detection unit detects signals from the sensors as a skew of the document being conveyed, a notification that there is a possibility that documents having different sheet widths are included in the plurality of stacked documents is issued.

Further features of the disclosure will become apparent from the following description of exemplary embodiments with reference to the attached drawings.

BRIEF DESCRIPTION OF THE DRAWINGS

FIG. 11 is a flowchart illustrating a method for controlling execution of a copy function.

DESCRIPTION OF THE EMBODIMENTS

The aspect of the embodiments is directed to a technique of notifying a user of an appropriate method for restarting the reading processing in a case where the reading processing is interrupted due to a detection of a skew of a document, in an image reading apparatus including, on a stacking unit, several types of sensors capable of detecting different sheet widths.

According to an aspect of the embodiments, it is possible to notify a user of an appropriate method for restarting reading processing in a case where the reading processing is interrupted because of a skew of a document detected in an image reading apparatus having several types of sensors on a stacking unit, which are capable of detecting different sheet widths.

Hereinafter, exemplary embodiments of the disclosure will be described in detail with reference to the accompanying drawings. The embodiments described hereinafter are not intended to limit the disclosure according to a scope of the appended claims, and not all the combinations of features described in the exemplary embodiments are required as the solutions of the disclosure.

A first exemplary embodiment of the disclosure will be described. In the present exemplary embodiment, a job for reading a document is executed. Scanning is interrupted in response to a skew of a document having been detected by skew detection sensors while the job is being executed. A description will be provided of a control method for notifying, in response to a detection of a skew of documents, a user of a method for a case of a skew and a method for a case where bound documents or mixed widths documents are placed on an auto-document feeder (ADF).

Figure 1:
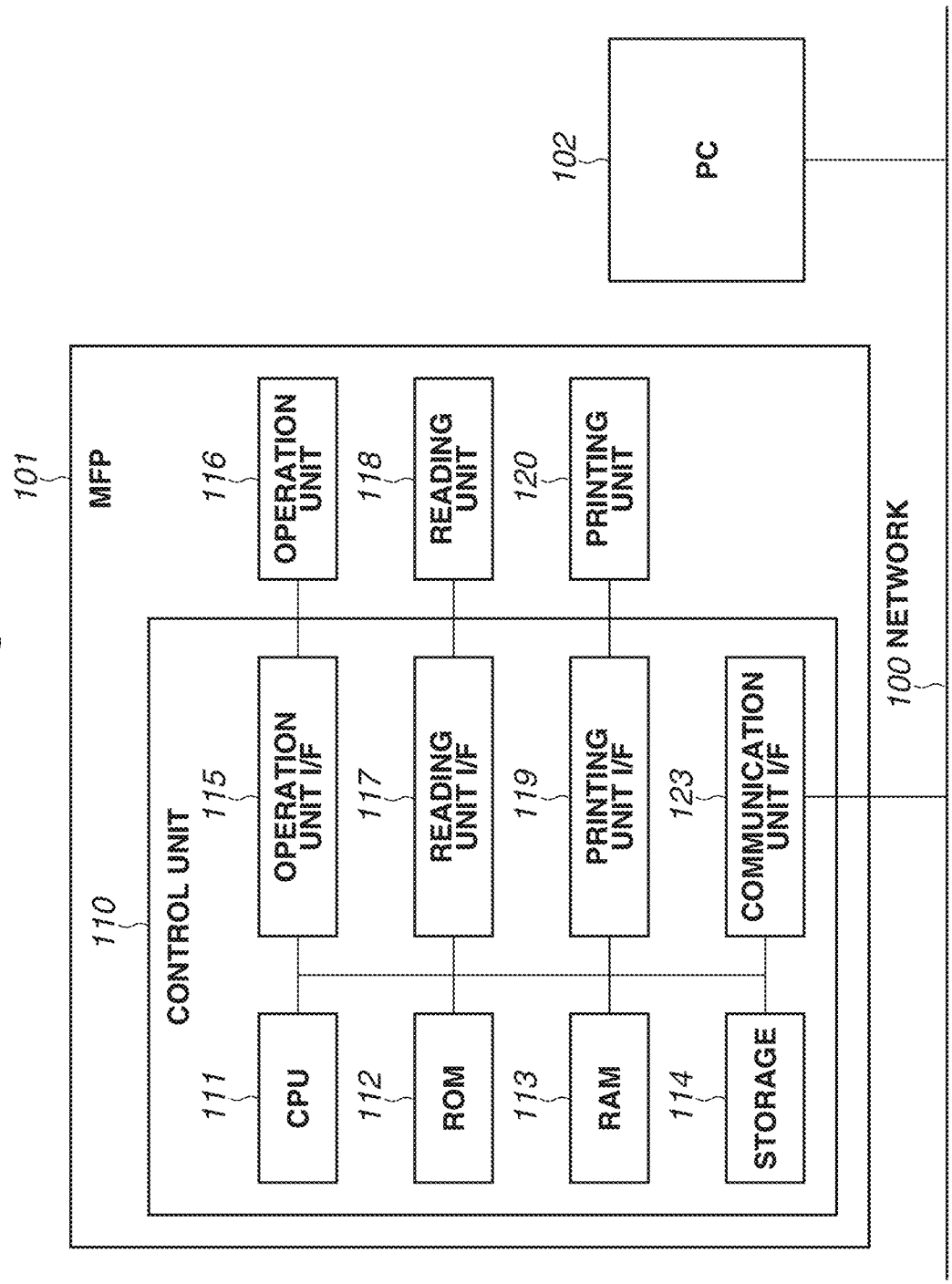
FIG. 1 is a block diagram illustrating an image reading system.

FIG. 1 is a block diagram illustrating an image reading system according to the present exemplary embodiment. In the present exemplary embodiment, a multi function peripheral (MFP) 101 and a personal computer (PC) 102 will be respectively described as one example of an image reading apparatus and one example of an information processing apparatus. The MFP 101 and the PC 102 are communicably connected to each other via a network 100.

While an image reading system having a single information processing apparatus is illustrated in FIG. 1, the MFP 101 and a plurality of information processing apparatuses may be communicably connected via the network 100. In the present exemplary embodiment, an image reading system including the MFP 101 and the PC 102 will be described, although the exemplary embodiment is not limited thereto. For example, the MFP 101 may be referred to as an image reading system.

Initially, the PC 102 will be described. The PC 102 can execute various programs, such as application programs. A scanner driver for enabling the PC 102 to use a reading function of the MFP 101 and a scanning application for processing and organizing scanned images are installed in the PC 102. The PC 102 can use the reading function of the MFP 101 by transmitting a scanning instruction to the MFP 101.

Next, the MFP 101 will be described. The MFP 101 includes a reading function for reading an image on a sheet and a printing function for printing an image on a sheet. The MFP 101 further includes a file transmitting function for transmitting image data to an external apparatus.

While the MFP 101 will be described as one example of the image reading apparatus in the present exemplary embodiment, the present exemplary embodiment is not limited thereto. The present exemplary embodiment is applicable to an image reading apparatus that conveys a document to read an image of the document. For example, the image reading apparatus may be a single-function scanner that does not have the printing function. The image reading apparatus may also be an apparatus that saves generated image data in an internal saving area. The image reading apparatus may also be a scanner that saves image data in an external memory (e.g., universal serial bus (USB) flash drive) attachable to and detachable from the image reading apparatus via an external bus, such as a USB. In the present exemplary embodiment, for example, the image reading apparatus includes various constituent elements described below.

A control unit 110 including a central processing unit (CPU) 111 controls overall operation of the MFP 101. The CPU 111 reads a control program stored in a read only memory (ROM) 112 or a storage 114 to execute various control, such as reading control and printing control. The ROM 112 stores a control program that is executable by the CPU 111. A random access memory (RAM) 113 is a main storage memory of the CPU 111, and used as a work area or a temporary storage area for loading various control programs stored in the ROM 112 and the storage 114. The storage 114 stores print data, image data, various programs, and various types of setting information. While it is assumed that an auxiliary storage device, such as a hard disk drive (HDD), is used as the storage 114 in the present exemplary embodiment, a non-volatile memory, such as a solid state drive (SSD), may also be used instead of the HDD.

While the one CPU 111 executes respective processes in operations illustrated in the below-described flowcharts by using a single memory (i.e., RAM 113) in the MFP 101 according to the present exemplary embodiment, other configurations may also be applicable. For example, the respective operations in the processing illustrated in the below-described flowcharts can be cooperatively executed by a plurality of CPUs, RAMs, ROMs, and storages. A part of the processing may be executed by using a hardware circuit, such as an application specific integrated circuit (ASIC) or a field-programmable gate array (FPGA).

Figure 2:
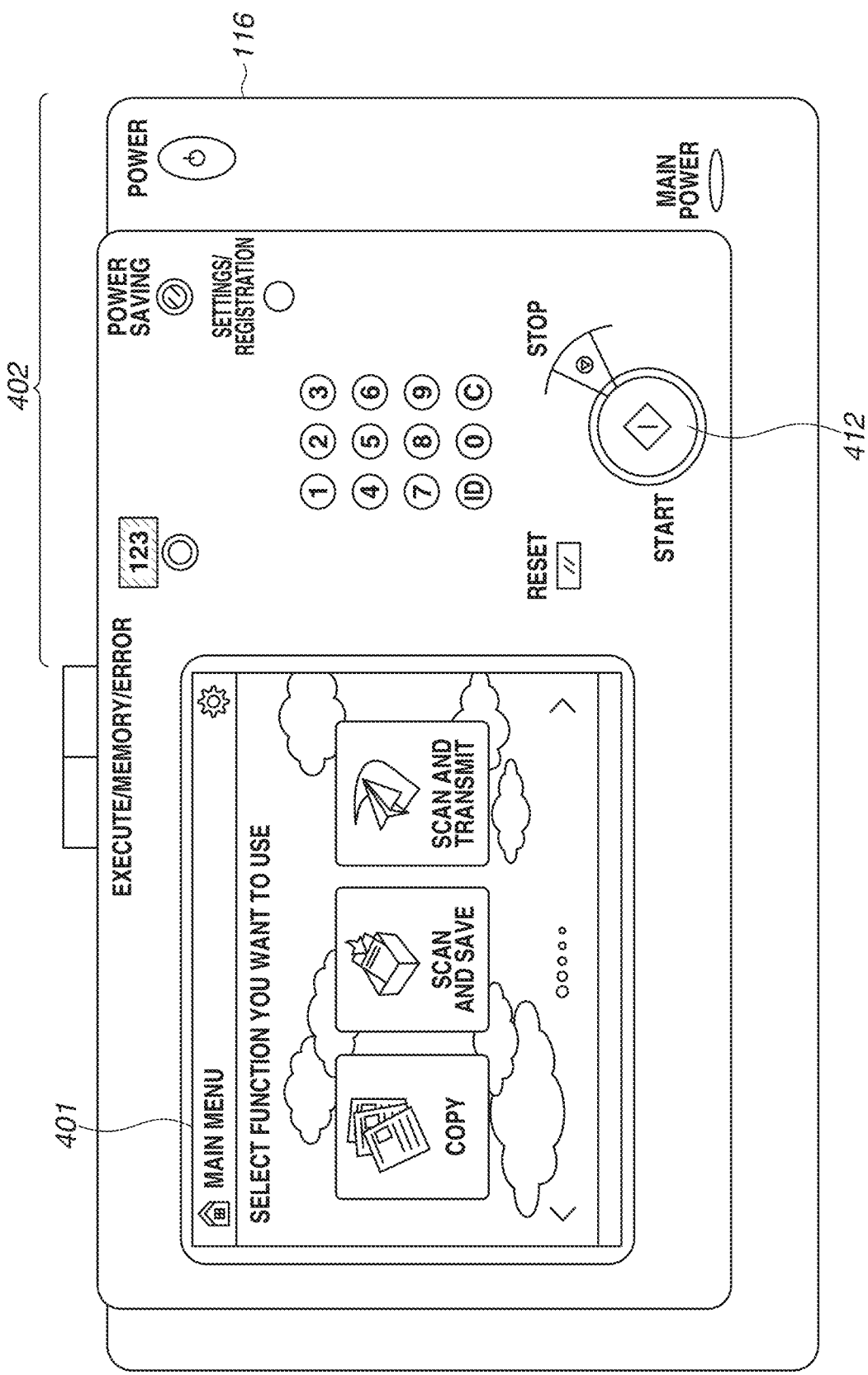
FIG. 2 is a diagram illustrating an external view of an operation unit.

An operation unit interface (I/F) 115 connects an operation unit 116 and the control unit 110. FIG. 2 is a diagram illustrating an external view of the operation unit 116. The operation unit 116 includes a panel 401 for displaying an operation screen and a hard key input unit 402 described below. Examples of the panel 401 include a touch-panel display. The hard key input unit 402 includes various hard keys such as a start key 412. The user inputs an instruction by touching a key displayed on the panel 401 or by pressing a hard key provided on the hard key input unit 402. The panel 401 may be a display that has no touch-panel function. In such a case, the panel 401 may be any type that includes a scroll key for selecting a key displayed on a display and an Enter key for entering the selected key as hard keys. The operation unit 116 functions as a receiving unit for receiving a user instruction input via the panel 401 or the hard key input unit 402, and also functions as a display unit for displaying the operation screen on the panel 401 as necessary.

Referring back to FIG. 1, a reading unit I/F 117 connects a reading unit 118 and the control unit 110. The reading unit 118 reads an image on a sheet to generate image data. The image data generated by the reading unit 118 is transmitted to an external device or printed on a sheet. A specific configuration of the reading unit 118 will be described below with reference to FIGS. 3 and 4.

A printing unit I/F 119 connects a printing unit 120 and the control unit 110. Image data to be printed is transferred to the printing unit 120 from the control unit 110 via the printing unit I/F 119. The printing unit 120 receives a control command and the image data to be printed via the control unit 110, and prints an image based on the image data on a sheet. An electrophotographic method or an ink-jet method may be employed as a printing method of the printing unit 120. Further, another method such as a thermal transfer method may be employed as the printing method as long as an image can be printed on a sheet.

The control unit 110 is connected to the network 100 via a communication unit I/F 123. The communication unit I/F 123 transmits image data and information to an external device connected to the network 100, and receives print data and information from an information processing apparatus connected to the network 100.

<Configuration of Reading Unit>

Figure 3:
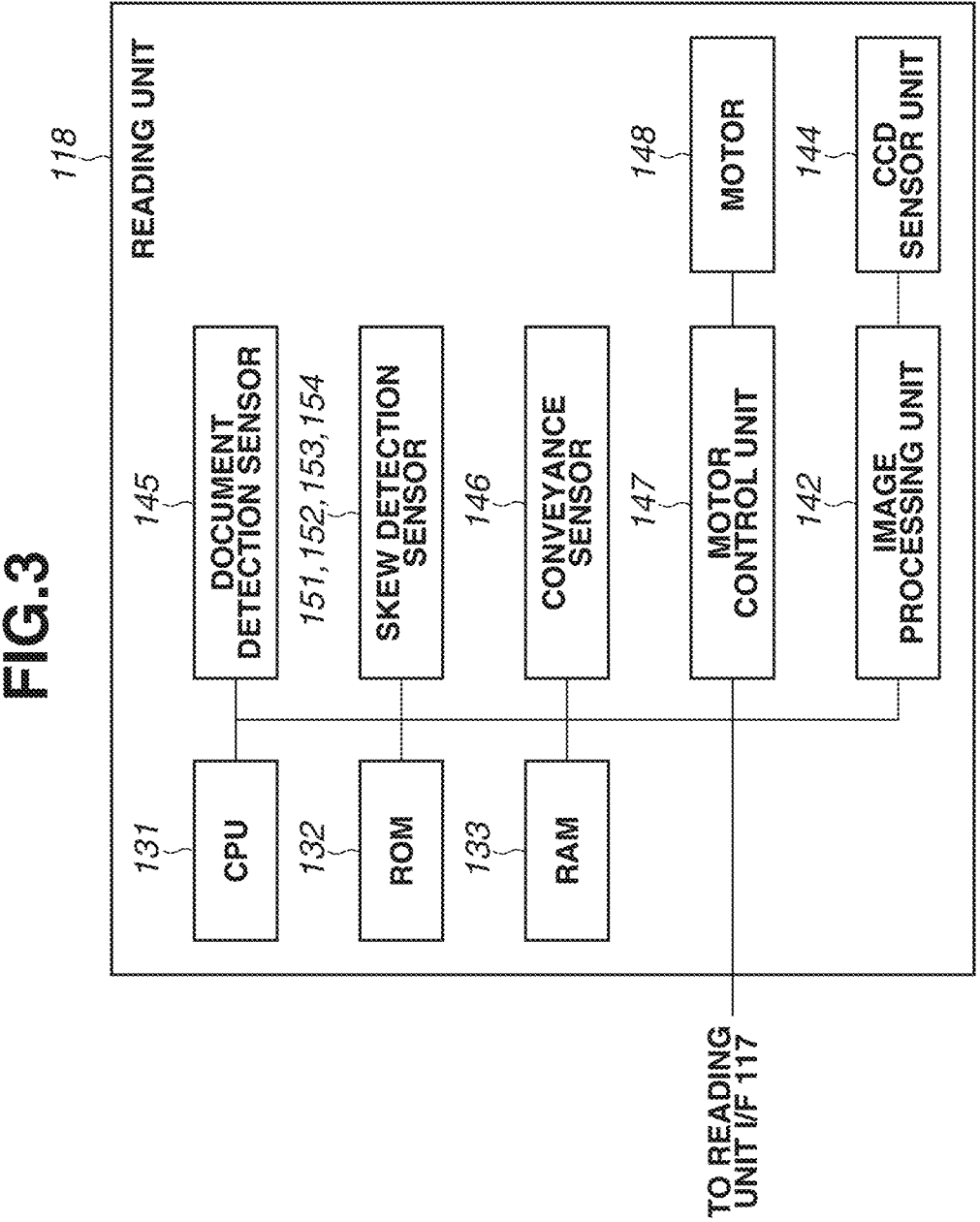
FIG. 3 is a block diagram illustrating a configuration of a reading unit.

A hardware configuration of the reading unit 118 will be described with reference to FIGS. 3 and 4. FIG. 3 is a block diagram illustrating a configuration relating to control of the reading unit 118. A CPU 131 controls the operation of the reading unit 118. The CPU 131 reads a control program stored in a ROM 132 to execute various types of control, such as reading control and communication with the control unit 110. The ROM 132 stores a control program that can be executed by the CPU 131. A RAM 133 is a main storage memory of the CPU 131, and used as a work area or a temporary storage area for loading various control programs stored in the ROM 132. The CPU 131, the ROM 132, and the RAM 133 may be realized by a microcontroller including therein an integrated circuit in which respective functions thereof are embedded.

The reading unit 118 further includes an image processing unit 142, a charge coupled device (CCD) sensor unit 144, a motor control unit 147, a motor 148, a document detection sensor 145, skew detection sensors 151, 152, 153, and 154, and other sensors such as conveyance sensors 146. The reading unit 118 is connected to the control unit 110 via the reading unit I/F 117.

The document detection sensor 145 detects that documents 203 are stacked on a document feeding tray 202. A detection signal output from the document detection sensor 145 is transmitted to the CPU 111 via the reading unit I/F 117.

The motor 148 is driven to rotate a pick-up roller 243, a separation driving roller 244, a separation driven roller 245, a conveyance roller pair 206, lead roller pairs 210 and 211, a platen guide roller 208, and a discharge roller pair 207 of the reading unit 118 described below. The motor 148 is driven to move an exposure unit 213 and a mirror unit 214 of the reading unit 118 described below.

In the present exemplary embodiment, the CPU 111 controls the motor control unit 147 to control the driving of the motor 148. However, the configuration is not limited thereto. The driving of the motor 148 may be controlled by the CPU 131 of the reading unit 118 controlling the motor control unit 147.

The skew detection sensors 151, 152, 153, and 154 detect the occurrence of a skew of a document. Each of the skew detection sensors 151, 152, 153, and 154 is arranged on a straight line intersecting with a conveyance direction of the document. In the skew detection, it is determined that the occurrence of a skew of the document occurs in a case where a temporal difference between times when the document is detected by the respective skew detection sensors 151, 152, 153, and 154 is greater than or equal to a threshold value. In addition, a threshold value for the temporal difference used for detecting skew of the document by the pair of the skew detection sensors 151 and 152 and the pair of the skew detection sensors 153 and 154 is stored in the storage 114. The detection signals output from the skew detection sensors 151, 152, 153, and 154 are transmitted to the CPU 111 via the reading unit I/F 117. The skew detection sensors 151, 152, 153, and 154 will be described below in detail with reference to FIG. 5.

The conveyance sensors 146 are arranged on respective checking points on the conveyance path of the document, and detect the occurrence of a conveyance error such as the document jam and the presence or absence of the document in the conveyance path. In response to the conveyance sensors 146 having detected the occurrence of the conveyance error, a maintenance screen (described below) is displayed on the panel 401.

Data read by the CCD sensor unit 144 is converted into a digital signal from an analog signal by an analog-to-digital (A/D) conversion unit (not illustrated). The digital signal is then converted into image data by the image processing unit 142, and temporarily stored in the RAM 113 via the reading unit I/F 117. Through the control executed by the CPU 111, the image data is stored in the storage 114.

Next, reading operation for reading an image of the document 203 (hereinafter, also referred to as "scanning") executed by the ADF will be described with reference to a sectional diagram of the reading unit 118 in FIG. 4. FIG. 4 is a sectional diagram of the reading unit 118.

The reading unit 118 includes a document feeding tray 202, regulation plates 231 and 232, and a discharge tray 222. The regulation plates 231 and 232 are movably arranged to be brought into contact with both edges of the document 203 placed on the document feeding tray 202. The documents 203 stacked on the document feeding tray 202 are conveyed and discharged to the discharge tray 222.

The reading unit 118 includes the pick-up roller 243 serving as a sheet-feeding unit, the separation driving roller 244, the separation driven roller 245, the conveyance roller pair 206, lead roller pairs 210 and 211, the platen guide roller 208, and the discharge roller pair 207.

The reading unit 118 includes the document detection sensor 145 and a post-separation sensor 143. The document detection sensor 145 detects the document 203 on the document feeding tray 202. The post-separation sensor 143 is arranged downstream of the separation driving roller 244 in the conveyance direction of the document 203, and detects a document 203.

The reading unit 118 further includes the skew detection sensors 151, 152, 153, and 154 and the conveyance sensors 146, which are also arranged downstream of the separation driving roller 244. The skew detection sensors 151, 152, 153, and 154 detect a skew in a width direction of the document 203, and the conveyance sensors 146 detect the occurrence of a conveyance error, such as a document jam, and the presence or absence of the document 203 in the conveyance path.

The reading unit 118 further includes a platen glass 212, a jump stand 217, a reference white plate 218, a document positioning glass 221, an exposure unit 213, a mirror unit 214, a lens 215, and a CCD sensor unit 144. The exposure unit 213 and the mirror unit 214 are movable in a sub-scanning direction that is the side to side direction in FIG. 4, by a wire (not illustrated) and a driving motor (not illustrated).

Figure 4:
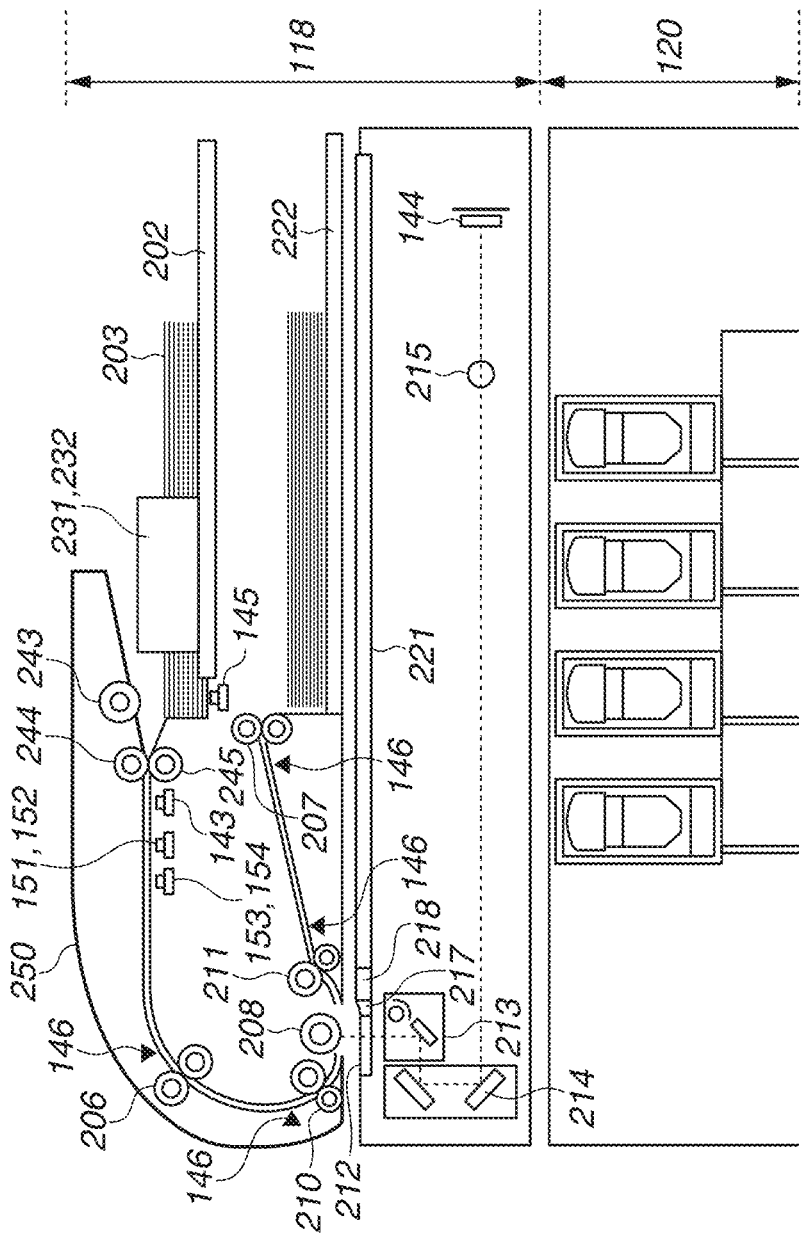
FIG. 4 is a sectional diagram of the reading unit.

In FIG. 4, the scanning is started in response to receiving a scanning execution instruction from the user in a case where the document 203 stacked on the document feeding tray 202 is detected by the document detection sensor 145.

When the scanning is started, the pick-up roller 243 supported by an arm (not illustrated) is moved downward and brought into contact with an uppermost document of the documents 203 stacked on the document feeding tray 202. The documents 203 are fed by the pick-up roller 243 and separated one by one at a separation nip serving as a separation unit, formed by the separation driving roller 244 and the separation driven roller 245. The separation driving roller 244 is made of a material, such as rubber, having friction slightly lower than that of the separation driven roller 245. A torque limiter is arranged on a path for transmitting driving force to the separation driven roller 245. Thus, the separation driven roller 245 is rotated in cooperation with the separation driving roller 244 when a single document is fed thereto, and is not rotated when the number of fed documents is two or more. This configuration enables the documents to be separated one by one. In addition, a driving force may be input to the separation driven roller 245 in the direction opposite to the conveyance direction of the document 203. A leading edge and a trailing edge of the document 203 passing through the separation nip are detected by the post-separation sensor 143, and detection results thereof are taken as references of timings of moving up and down the pick-up roller 243 and timings of starting and stopping the driving of the pick-up roller 243 and the conveyance roller pair 206. The document 203 that is conveyed one by one by the separation driving roller 244 and the separation driven roller 245 passes through the skew detection sensors 151, 152, 153, and 154, and is detected by a document passage detection sensor serving as one of the conveyance sensors 146. The reading unit 118 determines whether the first document 203 has passed based on the detection time. The document 203 conveyed inside of the apparatus by the conveyance roller pair 206 is conveyed to the platen glass 212 by the lead roller pair 210. The platen guide roller 208 is arranged to face the platen glass 212, and guides the document 203 passing through the platen glass 212 so as to prevent the document 203 from separating from the platen glass 212. When the document 203 passes over the platen glass 212, a face of the document 203 that is in contact with the platen glass 212 is exposed to light by the exposure unit 213, and an image of the document 203 is read in a main scanning direction and the sub-scanning direction. Light reflected on the document 203 acquired as a result of the scanning is transmitted to the mirror unit 214 via a plurality of mirrors. The transmitted reflection light passes through the lens 215, and is condensed and converted into electric signal data through the CCD sensor unit 144. The data output from the CCD sensor unit 144 is converted into image data by the above-described image processing unit 142, and transferred to the control unit 110. The reference white plate 218 is used as a reference of reading luminance of the document 203. The document 203 that has passed through the platen glass 212 is guided to the lead roller pair 211 by the jump stand 217 and discharged to the discharge tray 222 by the discharge roller pair 207. The CPU 111 rotates the respective rollers with a driving force of the motor 148 to convey the document 203. A discharge sensor serving as one of the conveyance sensors 146 detects the document 203 discharged to the discharge tray 222.

In the present exemplary embodiment, a reduction optical system which causes reflection light from the document 203 to form an image on the CCD sensor has been described as the optical system included in the reading unit 118. However, the optical system is not limited thereto. The optical system included in the reading unit 118 may be an equal magnification optical system which causes reflection light from the document 203 to form an image on a contact image sensor (CIS).

In the operation of reading an image of the document 203 which is executed by the reading unit 118, while a case is described in which a position of the optical system is fixed, and an image of the document 203 is read while the document 203 is being conveyed by the ADF, the present exemplary embodiment is not limited thereto. A position of the document 203 may be fixed after the document 203 is conveyed to the document positioning glass 221, so that an image of the document 203 can be read by the optical system being moved with the driving force of the motor 148.

A cover 250 covers a part of the conveyance path of the ADF. The cover 250 is configured to be openable and closeable by being rotated about a fulcrum shaft (not illustrated). The user can open the cover 250 to conduct work, such as jam-removal processing of removing a document jammed in or stopped at the conveyance path. In addition, an opening/closing sensor (not illustrated) for detecting an opening state and a closing state of the cover 250 may be arranged.

Hereinafter, the occurrence of a document jam in the conveyance path and the occurrence of a skew in a document are collectively referred to as "conveyance error". In a case where the document jam occurs, the user can remove the document pinched between the rollers of the lead roller pair 210 by pulling the document 203 in the direction opposite to the conveyance direction. In a case where a position of the document is close to the discharge tray 222, the user can convey and remove the document by operating a knob (not illustrated) for manually rotating the lead roller pair 211.

In the present exemplary embodiment, a maintenance screen which clearly presents how to remove the jammed document to the user can be displayed on the panel 401. For example, the maintenance screen is configured to present to a user a method for removing a document by opening a cover and a method for removing a document from a conveyance path by using an image and a moving image. The maintenance screen will be described below in detail.

<Skew Detection Mechanism>

Figure 5:
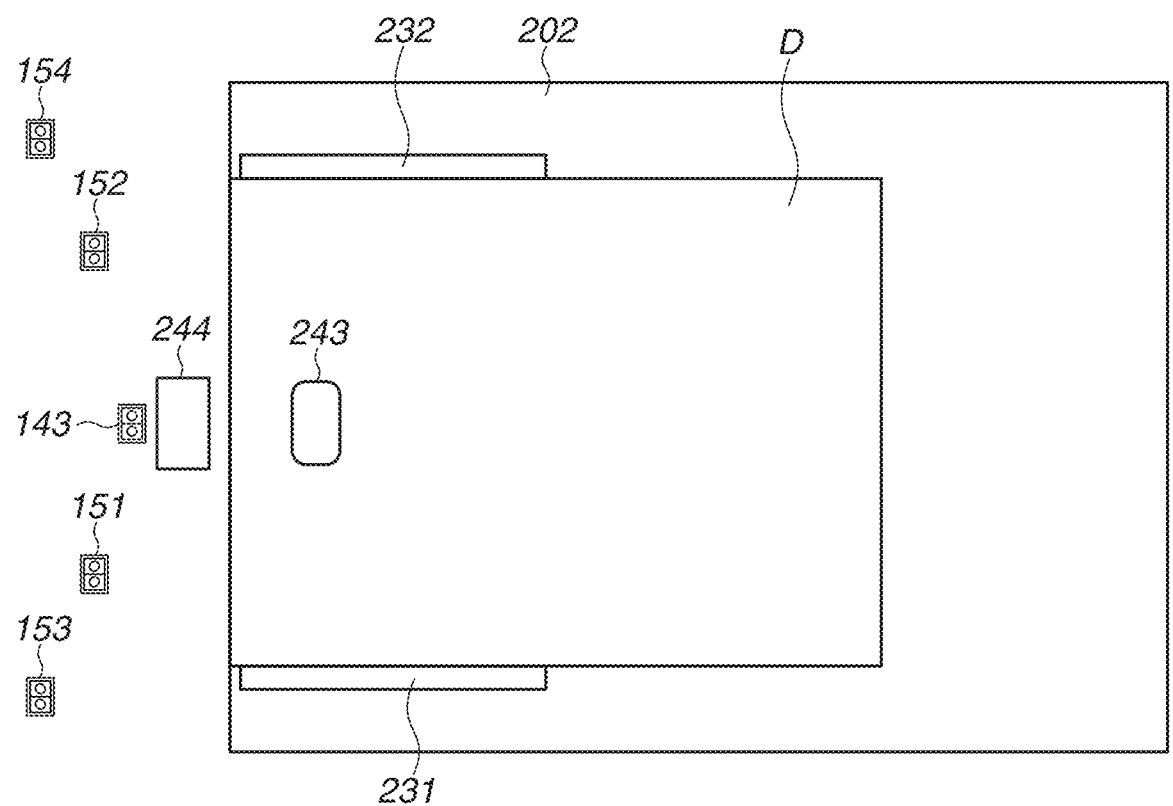
FIG. 5 is a plan view of a document feeding tray of the reading unit and its periphery viewed from above.

FIG. 5 illustrates a skew detection mechanism according to the present exemplary embodiment. Hereinafter, a skew detection operation which is executed by the reading unit 118 will be described with reference to FIG. 5. FIG. 5 is a plan view of the document feeding tray 202 of the reading unit 118 and its periphery viewed from above. While the skew detection mechanism is configured with a pair of two skew detection sensors in the present exemplary embodiment, the skew detection mechanism is not limited thereto. Any type of skew detection mechanism that includes a plurality of pairs of skew detection sensors is applicable.

The skew detection mechanism of the reading unit 118 is configured with the pair of the skew detection sensors 151 and 152 and the pair of the skew detection sensors 153 and 154. The pair of the skew detection sensors 151 and 152 are arranged downstream of the pick-up roller 243, the separation driving roller 244, and the post-separation sensor 143 in the conveyance direction. The pair of the skew detection sensors 153 and 154 are arranged downstream of the pair of the skew detection sensors 151 and 152 in the conveyance direction. The pair of the skew detection sensors 151 and 152 is arranged so that a distance therebetween is shorter than an A4R size sheet width, which is 210 mm. The pair of the skew detection sensors 153 and 154 is arranged so that a distance therebetween is shorter than an A3 size sheet width, which is 297 mm, and longer than an A4R size sheet width, which is 210 mm. Documents D are stacked on the document feeding tray 202, and edges of the documents D are evened by the regulation plates 231 and 232 on the document feeding tray 202. Each of the regulation plates 231 and 232 is cooperatively operated by, for example, a linkage mechanism, so as to be positioned at the same distance from the center of the conveyance path of the document in the width direction (i.e., a position of the post-separation sensor 143 in the width direction). With this configuration, the documents D placed on the document feeding tray 202 aligned against the regulation plates 231 and 232 are positioned at the middle of the conveyance path in the width direction. The uppermost sheet of the documents D is conveyed to the position of the separation driving roller 244 by the pick-up roller 243 and is fed. If a document to be conveyed is not skewed, an A4R size document can be detected by the pair of the skew detection sensors 151 and 152, and cannot be detected by the pair of the skew detection sensors 153 and 154. An A4 size document and an A3 size documents can be detected by both the pair of the skew detection sensors 151 and 152 and the pair of the skew detection sensors 153 and 154.

Figure 6A:
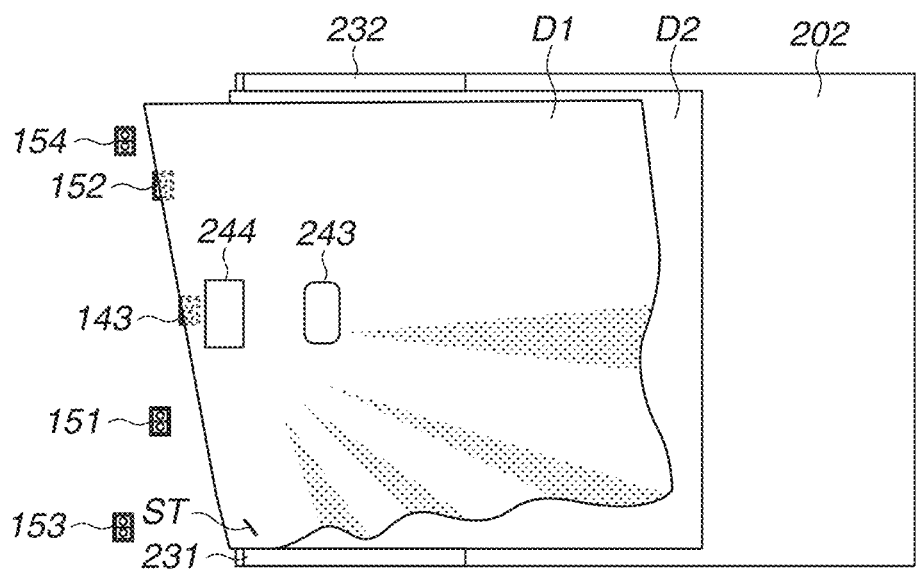
FIGS. 6A, 6B, and 6C are plan views each illustrating the document feeding tray of the reading unit and its periphery viewed from above.
Figure 6B:
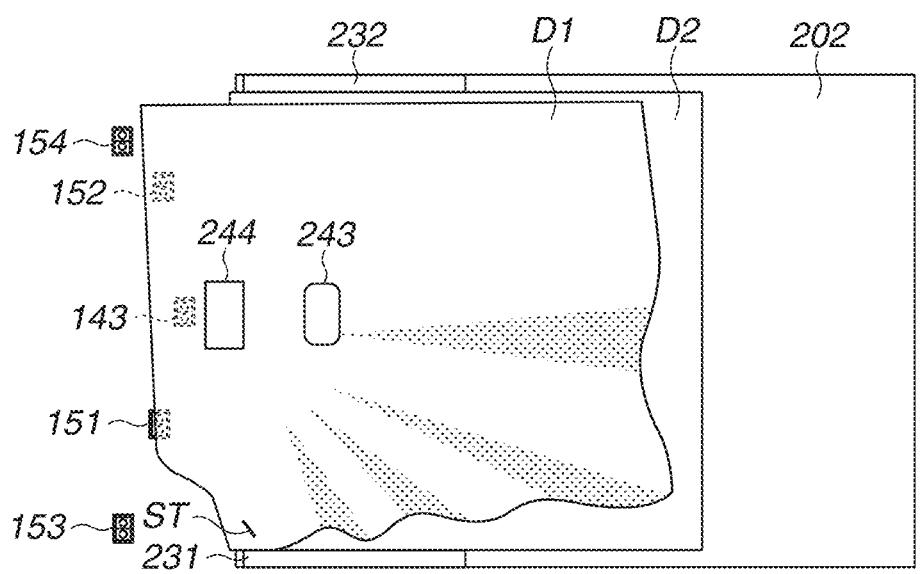
Figure 6C:
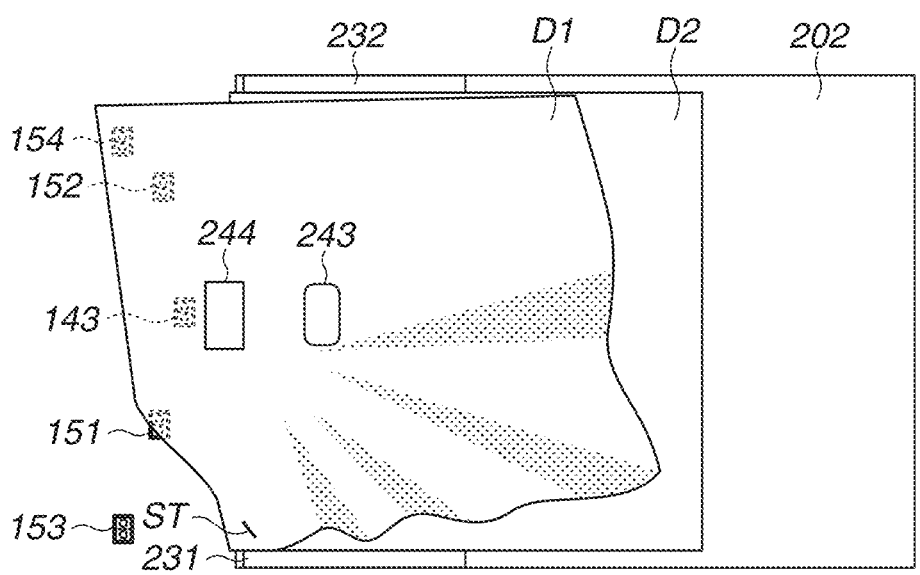

FIGS. 6A, 6B, and 6C are each a plan view of the document feeding tray 202 of the reading unit 118 and its periphery viewed from above, illustrating an example of operation when bound documents are conveyed. FIG. 6A illustrates a skewed state where the front edges of the documents are not deformed, which is an ideal state for skew detection. FIG. 6B illustrates a state where a skew begins to occur and the front edges of the documents are deformed, which is frequently occurs in practice. FIG. 6C illustrates a state which occurs in a case where the documents are conveyed continuously from the state illustrated in FIG. 6B.

The configurations and functions of the skew detection sensors 151, 152, 153, and 154, the pick-up roller 243, the separation driving roller 244, the post-separation sensor 143, the document feeding tray 202, and the regulation plates 231 and 232 are similar to those illustrated in FIG. 5.

In a state ideal for executing skew detection, a first document D1 is rotated about a staple ST, and a leading edge thereof has a shape expressed by a straight line extending from around the staple ST, in a case where bound documents are conveyed, as illustrated in FIG. 6A. In practice, while the side, with the staple ST, of the leading edge of the document D1 is stopped at a position of the separation driving roller 244, the other side thereof without the staple ST is likely to be conveyed along the regulation plate 232 approximately in parallel to the conveyance path as illustrated in FIG. 6B. Thus, a skew seldom occurs for an inner portion of the document where a pair of the skew detection sensors 151 and 152 are arranged. Thus, in order to detect the occurrence of a skew in a large-size document, a pair of the skew detection sensor 153 and 154 are to be used in addition to the pair of the skew detection sensor 151 and 152. When time has passed from the state illustrated in FIG. 6B, the side of the leading edge of the document D1 without the staple ST is conveyed in the conveyance direction, so that the document D1 becomes a state illustrated in FIG. 6C. This turns on of the skew detection sensor 154 arranged on the outside, thus enabling the skew detection for large-size bound documents.

Figure 7:
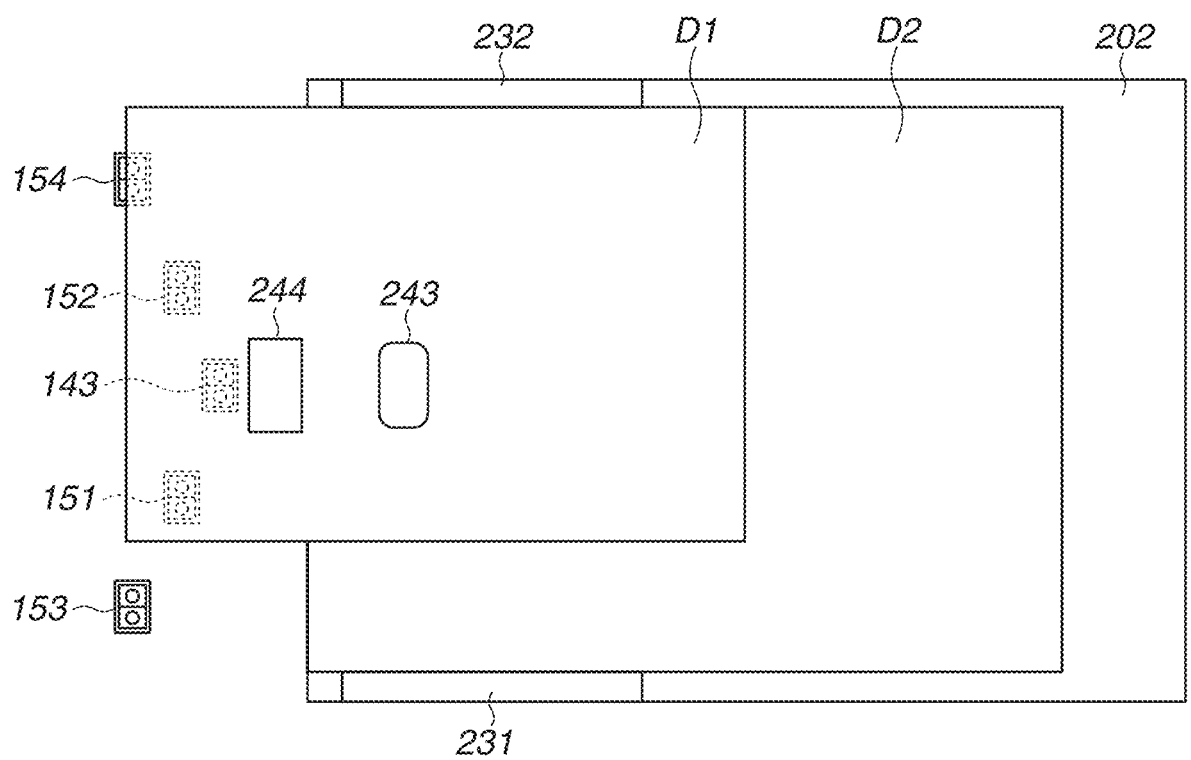
FIG. 7 is a plan view of the document feeding tray of the reading unit and its periphery viewed from above.

FIG. 7 is a plan view of the document feeding tray 202 of the reading unit 118 and its periphery viewed from above, illustrating an example of an operation when mixed documents having different widths are conveyed. In FIG. 7, an A4R size document D1 and an A3 size document D2 are placed on the document feeding tray 202. In the present exemplary embodiment, documents having different sizes in the width direction orthogonal to the conveyance direction of the documents are placed and conveyed simultaneously, and image forming processing is executed according to the respective sizes. The function of performing such image forming processing is referred to as "different-width mixed document size". To use the function of different-width mixed document size, the user has to enable the setting of the different-width mixed document size. The setting of the different-width mixed document size can be realized by the user operating the operation unit 116.

In FIG. 7, since the regulation plates 231 and 232 are arranged according to the large-size document D2, the ADF detects a document having the width of the document D2. Thus, the pair of the skew detection sensors 153 and 154 is used in addition to the pair of the skew detection sensors 151 and 152. In a case where mixed documents having different widths are placed, the occurrence of a skew of a small-size document D1 cannot be prevented by holding the document D1 between the regulation plates 231 and 232. Thus, the occurrence of the skew of the document D1 is prevented by placing the document D1 with a long side thereof aligned against either one of the regulation plates 231 and 232. For example, the long side of the small-size document D1 is aligned against the regulation plate 232 on the rear side of the document feeding tray 202, i.e., the upper side in FIG. 7.

<Processing at Detection>

In the present exemplary embodiment, the user is notified that a skew has occurred in a case where a skew of a document has been detected, and the following control is also performed: notifying a user of a handling method for a case where a document is skewed and a handling method for a case where bound documents or mixed documents with different widths mixed are placed on the ADF. Herein, a method for restarting reading operation for document images after notifying the user of these handling methods will be described.

In a case where many bundles of documents are stacked on a document feeding tray, stapled documents may be erroneously set by the user. Thus, the occurrence of a skew may not be able to be prevented even if the user adjusts the width between the regulation plates 231 and 232 to that of the documents. In view of this, in a case where bound documents are set, examples of information to be notified to the user to prevent the reoccurrence of a skew include information that prompts the user to remove stapled documents from the bundle of documents.

In a case where mixed documents having different widths are set, possible examples of information to be notified to the user to avoid the above-described erroneous skew detection include information that prompts the user to make the setting of the different-width mixed document size and information that suggests to the user that skew detection of the skew detection sensors be disabled temporarily.

In some cases, the user has to open the cover 250 of the reading unit 118 to remove a document in a case where a skew is detected. For example, in a case where reading processing of documents is interrupted due to the detection of a skew at a timing when the fifth document is being conveyed, the user has to open the cover 250 of the reading unit 118 to remove the fourth and/or previous documents. The detection of a skew and a document jam at the conveyance path may occur at the same timing.

Accordingly, in a case where a skew is detected, a method for removing a document jammed in or stopped at the conveyance path is also notified to the user in addition to the information for preventing the reoccurrence of a skew, in the present exemplary embodiment. For example, the maintenance screen that clearly presenting a method for removing a document to the user and the screen that displaying the information for preventing the reoccurrence of a skew are both displayed in the present exemplary embodiment. An example of a method for displaying the screens will be specifically described with reference to FIGS. 8A, 8B, 8C and 8D.

FIGS. 8A, 8B, 8C and 8D are diagrams illustrating examples of screens displayed on the panel 401 in a case where a skew is detected by the skew detection sensors 151, 152, 153, and 154 of the reading unit 118 in FIG. 3.

Figure 8A:
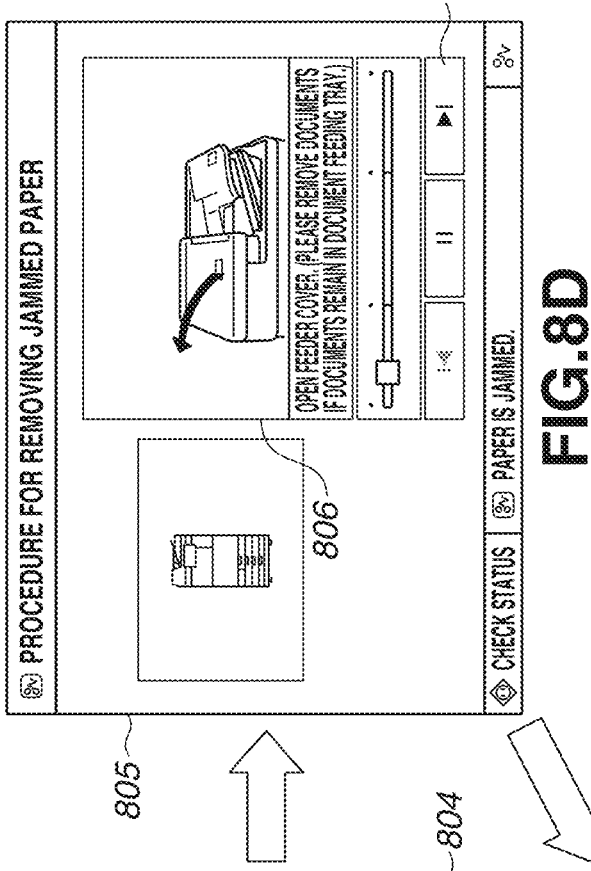
FIGS. 8A, 8B, 8C, and 8D are diagrams each illustrating an operation screen displayed on a panel.
Figure 8B:
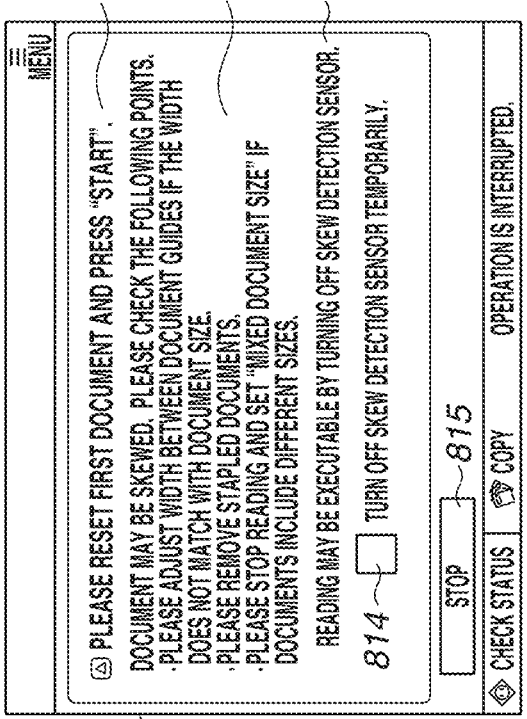
Figure 8C:
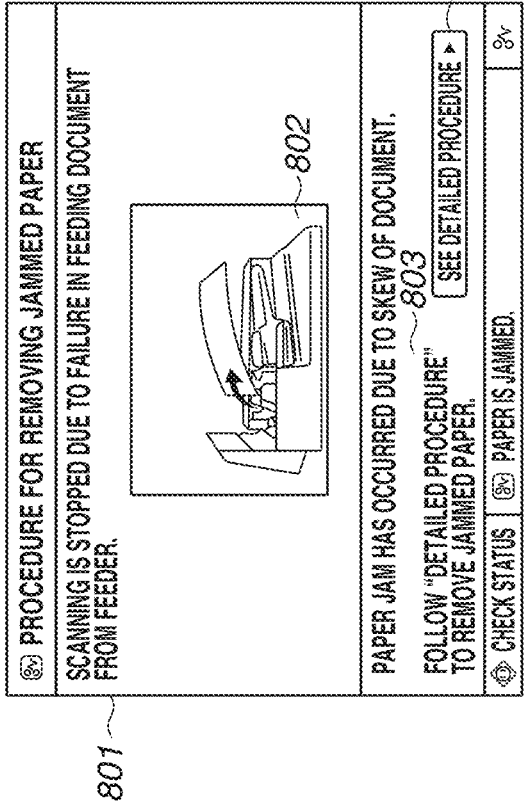
Figure 8D:
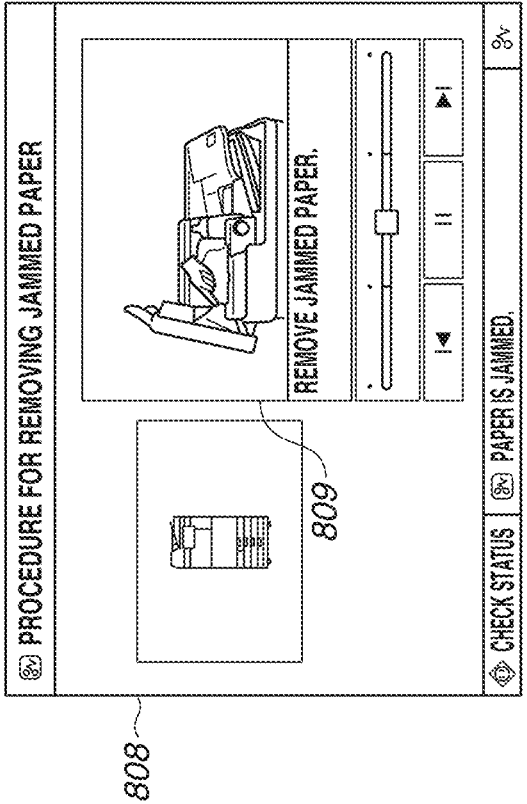

FIG. 8A illustrates an example of a maintenance screen displayed as an initial screen when skew is detected. For the sake of convenience, this initial screen is called "simple maintenance screen". FIGS. 8B and 8C illustrate examples of maintenance screens each of which displays a work procedure for removing a document. These maintenance screens are displayed to a user who is unfamiliar with a method for resolving a document jam. For the sake of convenience, these screens are called "detailed maintenance screens". FIG. 8D illustrates an example of a screen that is displayed while the operation for rereading the documents is put on standby, after the document jam is resolved, in a case where a skew is detected.

The CPU 111 interrupts the conveyance of a document in response to the skew detection sensors 151, 152, 153, and 154 having detected the occurrence of a skew in reading a document by using the copy function or the file transmitting function. The CPU 111 displays a simple maintenance screen 801 illustrated in FIG. 8A on the panel 401.

Information 802 illustrates a method for removing a document to the user with an illustration. Here, a case in which a cover is opened to remove the document is illustrated.

Information 803 notifies the user of the occurrence of a skew of a document. The information 803 illustrates that the user can proceed to a screen for displaying a work procedure for removing a document by selecting a button "SEE DETAILED PROCEDURE" key 804.

The SEE DETAILED PROCEDURE key 804 is used for shifting the screen to a detailed maintenance screen which displays the work procedure for removing a document.

In response to the CPU 111 detecting that the SEE DETAILED PROCEDURE key 804 is pressed, the CPU 111 displays a detailed maintenance screen 805 in FIG. 8B on the panel 401. The screen 805 displays, as an example of the work procedure for removing a document remaining in the conveyance path, a message prompting the user to open the cover 250 of the reading unit 118. An area 806 is used for displaying a maintenance method. The CPU 111 provides a method for removing a document to the user by displaying an animation or a moving image showing the opening and closing of the cover 250 in the area 806. A key 807 is used for shifting the screen to a screen which displays the next work procedure.

When the CPU 111 detects that the key 807 is pressed in a state where the screen 805 is displayed thereon, the CPU 111 displays a detailed maintenance screen 808 of FIG. 8C on the panel 401. In addition, the screen 808 may be displayed when the opening of the cover 250 is detected by an opening/closing sensor (not illustrated).

The screen 808 displays a description of work for removing a document remaining in the conveyance path. An area 809 is used for displaying a method for removing the document. The CPU 111 provides the method for removing the document to the user by displaying an illustration or a moving image showing the method for removing the document in the area 809. An illustration or a moving image that prompts the user to close the cover 250 after removal of a document is also displayed in the area 809.

If the CPU 111 determines that an error state can be cancelled based on outputs from the conveyance sensors 146 and the opening/closing sensor (not illustrated), the CPU 111 displays a rereading standby screen 810 illustrated in FIG. 8D on the panel 401. Information 811 notifies the user that the processing can be restarted by pressing a start key 412 after resetting the documents on the document feeding tray 202. In other words, the user can restart the operation of reading documents by pressing the start key 412. When the CPU 111 detects that the start key 412 is pressed, the CPU 111 displays a screen for the copy function or the file transmitting function, which has been displayed before skew is detected.

The above-described plurality of causes of interruption of the reading processing and the plurality of handling methods for the causes are displayed on the rereading standby screen 810.

Information 812 notifies the user of the occurrence of a skew of the document. The information 812 also notifies the user that a width between the regulation plates 231 and 232 (i.e., "document guide" in FIG. 8D) has to be adjusted to that of the document in order to prevent the reoccurrence of a skew as a method for handling a skew occurring in a document. The information 812 also notifies the user that stapled documents have to be removed from a bundle of documents in order to prevent the reoccurrence of a skew as the method for handling bound documents placed on the ADF. The information 812 further notifies the user that the user has to stop rereading operation for documents and to make the setting of the different-width mixed size document to avoid an erroneous skew detection, as the handling method for a case where mixed documents having different widths are placed on the ADF.

Information 813 notifies the user that the user can read the mixed documents having different widths by temporarily disabling the skew detection function of the skew detection sensors to avoid erroneous skew detection, as the handling method for documents having different widths placed on the ADF.

The user can temporarily disable the skew detection function of the skew detection sensors 151, 152, 153, and 154 by pressing a key 814 in reading of the documents. When the CPU 111 detects that the start key 412 is pressed in a state where the skew detection function is disabled by the key 814 being pressed, the CPU 111 temporarily disables the skew detection function of the skew detection sensors 151, 152, 153, and 154 in reading the documents. By pressing the key 814, the user can read the mixed documents having different widths without making a stop of the conveyance operation due to the skew detection in rereading the documents. By selecting the key 814, the skew detection sensors 151, 152, 153, and 154 are disabled for an optional period, e.g., a period from when the key 814 is pressed to when a print job that is in execution is completed.

A stop key 815 is used for stopping the copy function or the file transmitting function that is in execution. The user can cancel the read documents and stop the processing that is in execution by pressing the stop key 815. In response to the CPU 111 having detected the press of the stop key 815, the CPU 111 displays a screen for the copy function or the file transmitting function displayed before a skew is detected. By pressing the stop key 815, the user can display the above-described screen and execute the copy function or the file transmitting function after making a new setting.

Figure 9A:
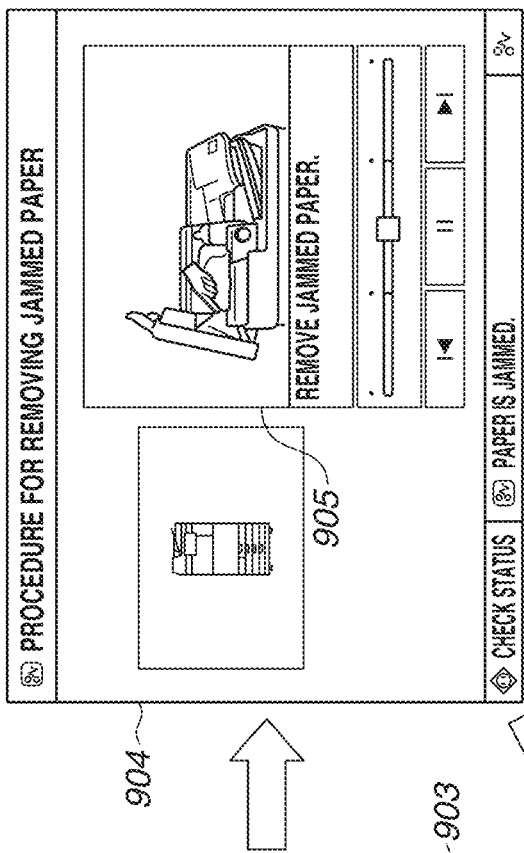
FIGS. 9A, 9B, and 9C are diagrams each illustrating an operation screen displayed on the panel.
Figure 9B:
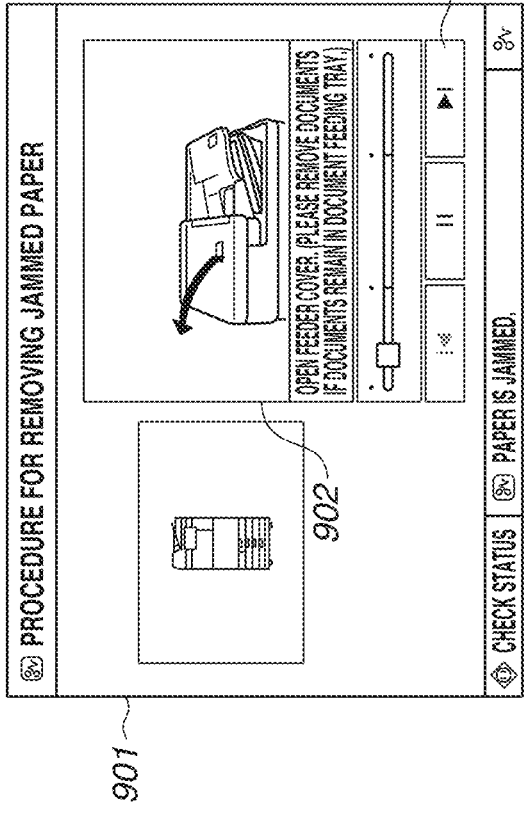
Figure 9C:
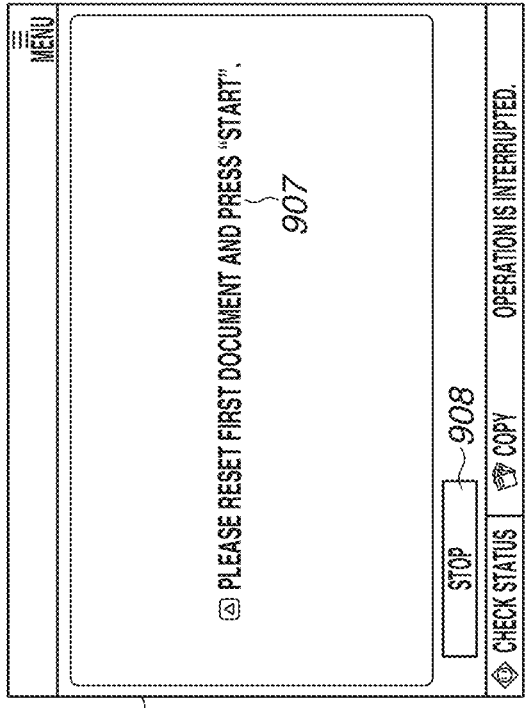

The rereading standby screen 810 is not displayed when the user follows the information 812 and sets "MIXED DOCUMENT SIZE" by pressing a MIXED DOCUMENT SIZE key 1002, or when the user follows the information indicated by the key 814 to disable the skew detection sensors and executes scanning processing of the mixed documents. A screen 906 is displayed instead of the screen 810 as will be described in step S1313. FIGS. 9A, 9B, and 9C are diagrams each illustrating an example of a screen displayed on the panel 401 when a document jam is detected by the conveyance sensors 146 in a state where a skew is not detected by the skew detection sensors 151, 152, 153, and 154 of the reading unit 118 in FIG. 3.

FIG. 9A illustrates an example of a detailed maintenance screen displayed as an initial screen when a document jam is detected with no skew detected. Similar to FIGS. 8B and 8C, FIGS. 9A and 9B each illustrate an example of detailed maintenance screens which provides the work procedure for removing a document. FIG. 9C illustrates an example of a screen which stands ready for the operation of rereading the documents, displayed when a document jam is resolved.

The CPU 111 interrupts the conveyance of a document in a case where the occurrence of a document jam is detected by the conveyance sensors 146 when a document is being read by the copy function or the file transmitting function. The CPU 111 displays a detailed maintenance screen 901 of FIG. 9A on the panel 401.

A message prompting the user to open the cover 250 of the reading unit 118 is displayed on the screen 901 as an example of the work procedure for removing a document remaining in the conveyance path. A maintenance method is displayed in an area 902. The CPU 111 provides a method for removing a document to the user by displaying an animation or a moving image showing the opening and closing of the cover 250 in the area 902. A key 903 is used for shifting the screen to a screen displaying the next work procedure.

When the CPU 111 detects the press of the key 903 in a state where the screen 901 is displayed thereon, the CPU 111 displays a detailed maintenance screen 904 of FIG. 9B on the panel 401. In addition, the detailed maintenance screen 904 may be displayed when an opening/closing sensor (not illustrated) detects that the cover 250 is opened.

The content of work for removing a document remaining in the conveyance path is displayed on the screen 904. The method for removing a document is displayed in an area 905. The CPU 111 provides the method for removing the document to the user by displaying, in the area 905, an illustration or a moving image showing the method for removing the document. The area 905 also displays the illustration or the moving image that prompts the user to close the cover after removing the document.

Figure 10A:
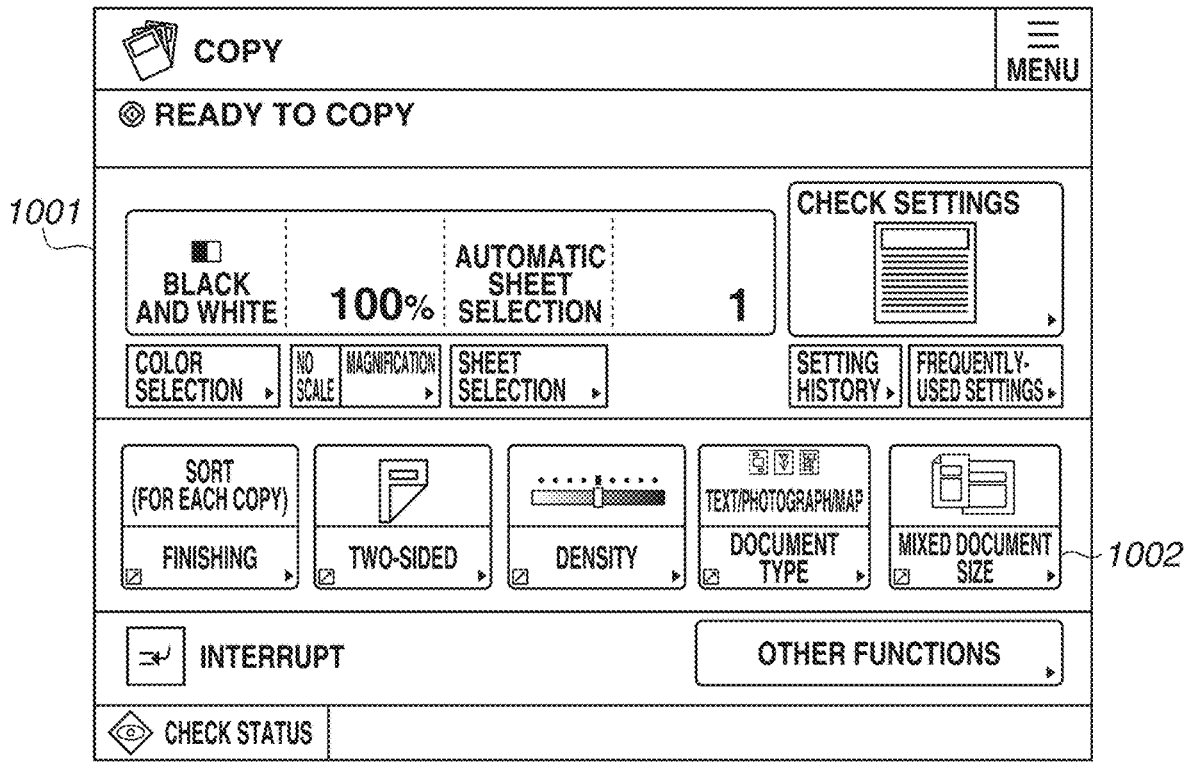
FIGS. 10A, 10B, and 10C are diagrams each illustrating an operation screen.
Figure 10B:
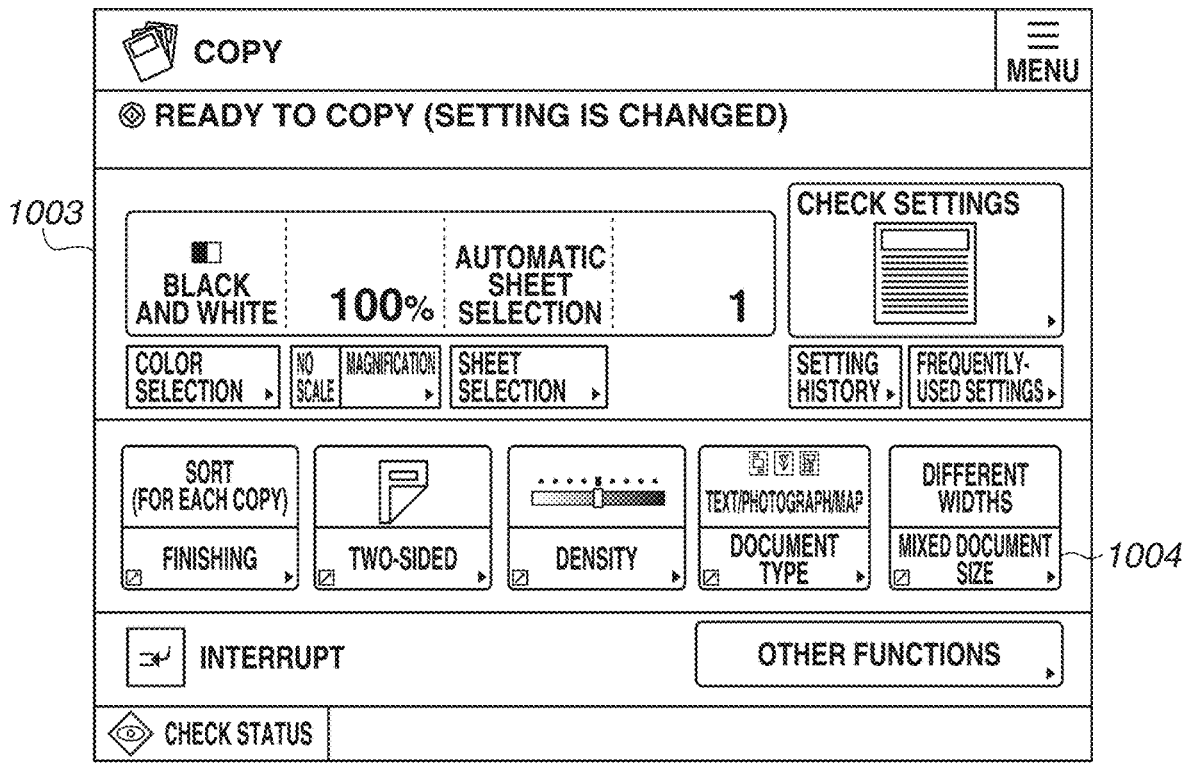
Figure 10C:
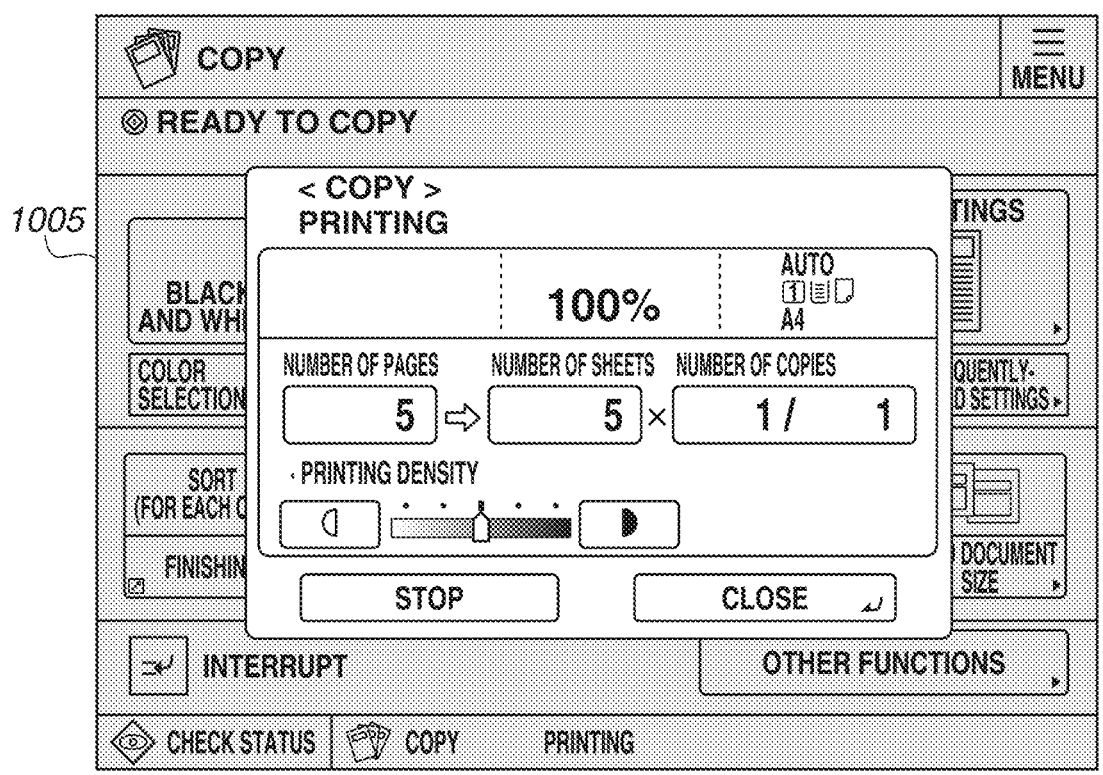

When the CPU 111 determines that an error state can be cancelled based on, for example, the conveyance sensors 146 and the opening/closing sensor (not illustrated), the CPU 111 displays a rereading standby screen 906 illustrated in FIG. 9C on the panel 401. Information 907 notifies the user that the processing can be restarted by pressing the start key 412 after resetting the documents on the document feeding tray 202. In other words, the user can restart the reading operation for documents by pressing the start key 412. When the CPU 111 detects the press of the start key 412, the CPU 111 displays a screen for the copy function or the file transmitting function displayed before a document jam is detected. For example, a screen indicating in-execution of the corresponding function as illustrated in FIG. 10C is displayed thereon.

A stop key 908 is used for stopping the copy function or the file transmitting function that is in execution. The user can cancel the read documents and stop the processing that is in execution by pressing the stop key 908. When the CPU 111 detects the press of the stop key 908, the CPU 111 displays the screen for the copy function or the file transmitting function displayed before a document jam is detected.

For specific control processing for displaying information for preventing the reoccurrence of a skew, the copy function of the MFP 101 will be described as an example.

First, settings for copying processing will be described. FIGS. 10A, 10B, and 10C are diagrams each illustrating an example of a copy screen displayed on the panel 401. FIGS. 10A and 10B each illustrate an example of a setting screen. FIG. 10C illustrates an example of an execution screen displayed when the copying processing is being executed.

A user of the MFP 101 can select the copy function from a main screen (not illustrated) displayed on the panel 401. Buttons (icons) for starting various functions of the MFP 101 (e.g., copy function, file transmitting function, and file saving function) are selectively displayed on the main screen.

The CPU 111 displays a setting screen 1001 illustrated in FIG. 10A in response to the user having pressed a copy function button in a state where the main screen is displayed.

The user can make various copy settings through the setting screen 1001. For example, the user can execute various settings with respect to the number of copies, a black-and-white or color printing mode, and a two-sided printing mode. In addition, a copy job setting includes various setting items which are not illustrated. Thus, it is difficult to set all of the setting items in a single screen. Accordingly, the user shifts the setting screen 1001 to an individual setting screen for each of the setting items to make a setting of a plurality of functions.

The MIXED DOCUMENT SIZE key 1002 is a key for selecting whether to enable or disable the setting of the different-width mixed document size. The user can change the enabling and disabling of the different-width mixed document size by using the MIXED DOCUMENT SIZE key 1002. The setting screen 1001 illustrates a state where the setting of the different-width mixed document size is disabled.

When the CPU 111 detects the press of the MIXED DOCUMENT SIZE key 1002 in a state where the setting screen 1001 is displayed thereon, the CPU 111 displays a setting screen 1003 on the panel 401. The setting screen 1003 illustrates a state where a setting of the different-width mixed document size is enabled as illustrated by the MIXED DOCUMENT SIZE key 1004. It is assumed that the MIXED DOCUMENT SIZE key 1004 is displayed in a display mode different from a display mode of the MIXED DOCUMENT SIZE key 1002. A difference between the display modes of the MIXED DOCUMENT SIZE keys 1002 and 1004 is not limited to the example illustrated in FIGS. 10A and 10B. For example, the MIXED DOCUMENT SIZE key 1004 may be displayed in a shape different from that of the MIXED DOCUMENT SIZE key 1002. Alternatively, the MIXED DOCUMENT SIZE key 1002 may be displayed without blinking and the MIXED DOCUMENT SIZE key 1004 may be displayed with blinking.

When the CPU 111 detects the press of the start key 412 in a state where the setting screen 1001 or 1003 is displayed, the CPU 111 starts executing the copying processing. The CPU 111 starts reading operation for the documents by using the reading unit 118, and displays a copy execution screen 1005 of FIG. 10C on the panel 401.

Next, a description will be described of, a method for controlling the displaying of information for preventing the reoccurrence of a skew in the copying processing (illustrated in FIGS. 8A, 8B, 8C, and 8D) with reference to the flowcharts in FIGS. 11 to 13. The copying processing will be described as an example here.

Figure 12:
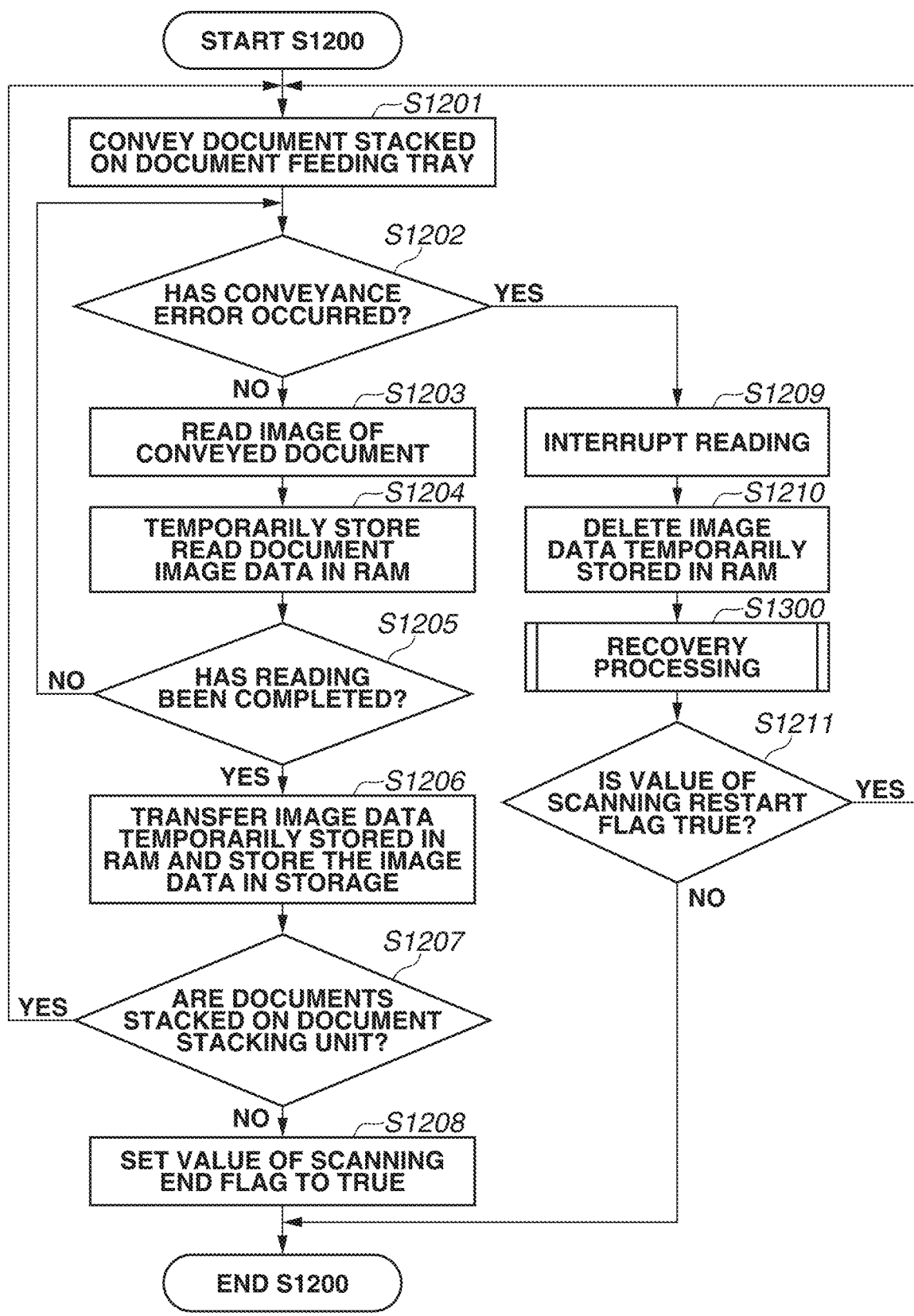
FIG. 12 is a flowchart illustrating a method for controlling execution of a copy function.
Figure 13:
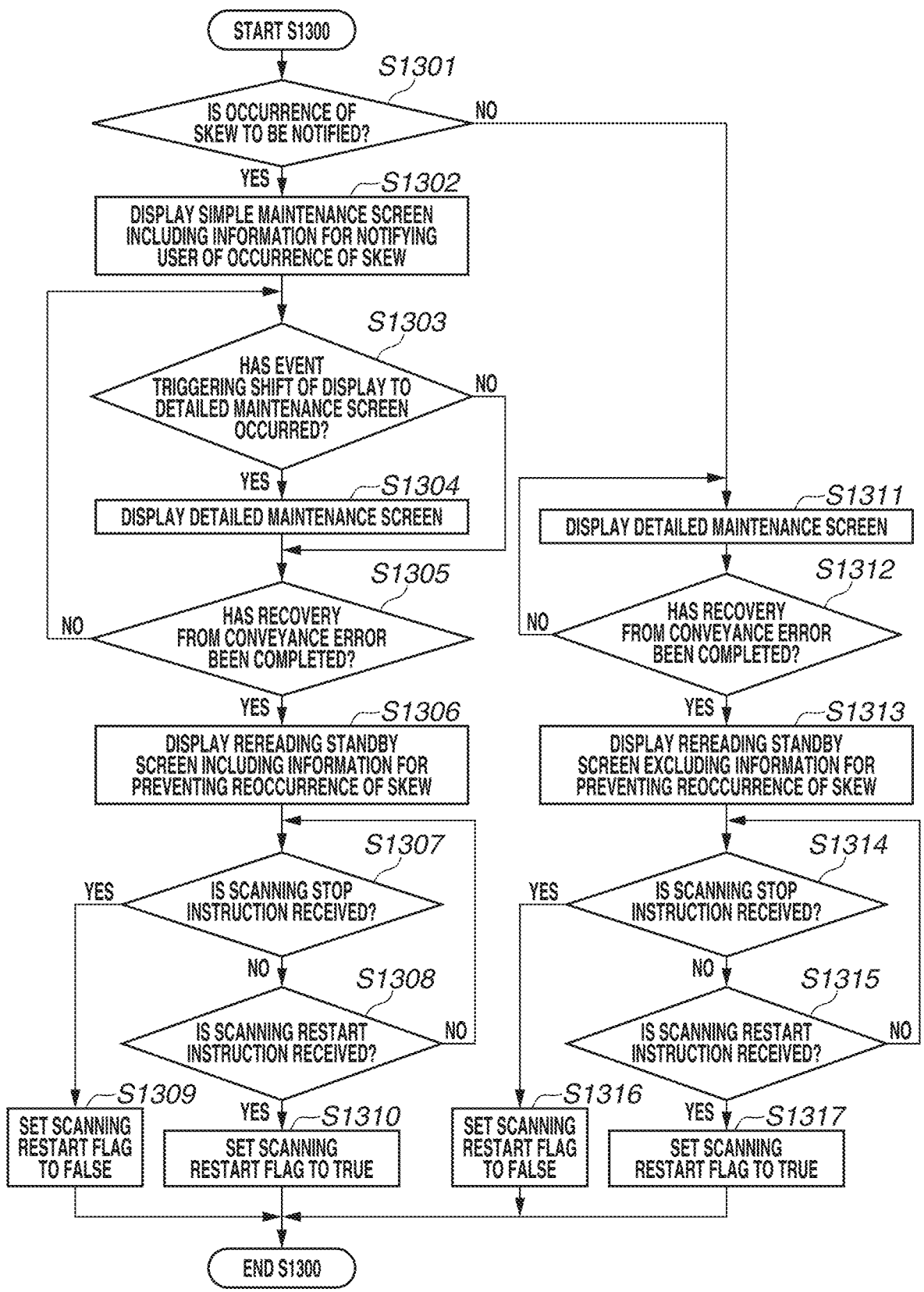
FIG. 13 is a flowchart illustrating a method for controlling execution of a copy function.

The CPU 111 reads a control program stored in the ROM 112 or the storage 114 to the RAM 113 and executes the control program to realize respective processing operations (steps) of flowcharts illustrated in FIGS. 11 to 13. Apart of the control program that realizes the respective operations of processing may be executed by another CPU (e.g., the CPU 131 of the reading unit 118), and the respective operations of processing may be realized by the control program executed cooperatively.

Referring now to FIG. 11, in step S1101, the CPU 111 determines whether an execution instruction for a copy job is received. If the CPU 111 determines that the execution instruction is received (YES in step S1101), the processing proceeds to step S1102. If the CPU 111 determines that the execution instruction is not received (NO in step S1101), the operation in step S1101 is executed repeatedly until the execution instruction is received. More specifically, the CPU 111 determines that an execution instruction for a copy job is received when the user presses the start key 412 in a state where the setting screen 1001 illustrated in FIG. 10A is displayed on the panel 401. In a case where the execution instruction for the copy job is received, the CPU 111 displays the copy execution screen 1005 on the panel 401.

In step S1102, the CPU 111 sets (initializes) a value of a flag (hereinafter, called "scanning end flag") to "FALSE". The scanning end flag is a flag that indicates whether a series of processing of reading (scanning) images of documents is ended normally. The value of the scanning end flag is temporarily stored in the RAM 113.

The scanning end flag having a value of "TRUE" indicates that scanning is ended normally. The scanning end flag having a value of "FALSE" indicates that scanning is not ended normally. For example, in a case where a scanning stop instruction is received or execution of a copy job is cancelled, the CPU 111 determines that scanning is not ended normally, and rewrites the value of the scanning end flag to "FALSE". After executing the processing in step S1102, the CPU 111 advances the processing to scanning processing in step S1200. In step S1200, the CPU 111 executes a series of processing relating to the scanning.

<Scanning Processing>

Referring now to FIG. 12, details of the series of processing in step S1200 relating to the scanning will be described.

In step S1201, the CPU 111 controls the reading unit 118 and conveys the documents 203 stacked on the document feeding tray 202.

In step S1202, the CPU 111 determines whether a conveyance error of the documents conveyed in step S1201 has occurred. The CPU 111 controls the reading unit 118 and acquires output values of the plurality of conveyance sensors 146 and a rotation frequency of the driving motor. The CPU 111 then determines whether a document jam has occurred based on the acquired values. If a document jam has occurred, the CPU 111 determines that the conveyance error has occurred (YES in step S1202), and the processing proceeds to step S1209.

The CPU 111 acquires the output values of the skew detection sensors 151, 152, 153, and 154. In a case where the setting of the different-width mixed document size is disabled on the copy setting and a skew is detected by the skew detection sensors 151, 152, 153 and 154, the CPU 111 also determines that the conveyance error has occurred. The processing then proceeds to step S1209.

In a case where a document jam does not occur, the CPU 111 determines that the conveyance error has not occurred (NO in step S1202), and the processing proceeds to step S1203. In addition, in a case where a setting of the different-width mixed document size is enabled or the skew detection function is temporarily disabled, the CPU 111 determines that the conveyance error has not occurred even if a skew is detected by the skew detection sensors 151, 152, 153, and 154. Thus, the processing proceeds to step S1203.

In step S1203, the CPU 111 controls the reading unit 118 and reads a document to generate data when the document 203 conveyed in step S1201 passes through the platen glass 212. In step S1204, the CPU 111 controls the reading unit 118 and converts data read in step S1203 to image data through the image processing unit 142. The CPU 111 controls the reading unit 118 to temporarily store the converted image data in the RAM 113.

In step S1206, the CPU 111 saves the image data temporarily stored in the RAM 113 in step S1204 in the storage 114. In step S1207, the CPU 111 determines whether documents 203 are stacked on the document feeding tray 202. More specifically, the CPU 111 controls the reading unit 118 and acquires the output value of the document detection sensor 145. The CPU 111 determines whether the documents 203 are stacked on the document feeding tray 202 based on the acquired value. If the CPU 111 determines that the documents 203 are stacked on the document feeding tray 202 (YES in step S1207), the processing returns to step S1201, and the conveyance of the next document 203 is executed. If the CPU 111 determines that the documents 203 are not stacked on the document feeding tray 202 (NO in step S1207), the processing proceeds to step S1208. In step S1208, the CPU 111 rewrites the value of the scanning end flag stored in the RAM 113 to "TRUE" and ends the processing in step S1200. The processing then proceeds to step S1103.

Next, operations which are executed when the occurrence of the conveyance error is determined (YES in step S1202) will be described. In step S1209, the CPU 111 controls the reading unit 118 and interrupts scanning. The CPU 111 stops the conveyance and image-reading of the document based on the interruption of scanning. The processing then proceeds to step S1210.

In step S1210, the CPU 111 deletes the image data temporarily stored in the RAM 113 in step S1204. The processing then proceeds to step S1300. In step S1300, the CPU 111 executes recovery processing with respect to the conveyance error. Through the processing in step S1300, recovery from the conveyance error is performed and a scanning restart flag indicating whether to restart scanning is set. A flow of recovery processing will be described below with reference to the flowchart in FIG. 13.

In step S1211, the CPU 111 refers to a value of the scanning restart flag set through the series of recovery processing in step S1300. If the value of the scanning restart flag is "FALSE" (NO, in step S1211), the processing in step S1200 is ended, and the processing proceeds to step S1103 in FIG. 11. At this time, the CPU 111 closes a screen relating to recovery processing and shifts the screen to be displayed on the panel 401 to the copy execution screen 1005.

If the value of the scanning restart flag is "TRUE" (if a value is not "FALSE") (YES, in step S1211), the processing returns to step S1201. The CPU 111 then executes processing of conveying the documents 203 restacked on the document feeding tray 202 by the user. At this time, the CPU 111 closes a screen relating to recovery processing and shifts the screen to be displayed on the panel 401 to the copy execution screen 1005.

In the processing in step S1211, if a scanning stop instruction is received in the recovery processing in step S1300, the CPU 111 ends the scanning processing while maintaining "FALSE" for the value of the scanning end flag. Thus, the copying processing can be stopped through the below-described processing.

<Recovery Processing with Respect to Conveyance Error>

Next, the recovery processing with respect to a conveyance error which is executed in step S1300 will be described in detail with reference to the flowchart in FIG. 13.

In step S1301, the CPU 111 determines whether to notify the occurrence of a skew of the document to the user. More specifically, the CPU 111 acquires the output values of the skew detection sensors 151, 152, 153, and 154. If the CPU 111 determines that a conveyance error has occurred based on a skew detected by the skew detection sensors 151, 152, 153, and 154 in a state where the setting of the different-width mixed document size is disabled in the copy setting, the CPU 111 determines that the occurrence of the skew is to be notified to the user (YES in step S1301), so that the processing proceeds to step S1302. if the setting of the different-width mixed document size is enabled in the copy setting, if the skew detection function of the skew detection sensors 151, 152, 153, and 154 is temporarily disabled (no conveyance error is determined to have occurred even if skew is detected), or if a skew is not detected (NO, in step S1301), the processing proceeds to step S1311

The processing in step S1301 is executed so that the information for preventing the reoccurrence of a skew is not to be displayed in a case where no skew is detected, a case where the setting of the different-width mixed document size is enabled, or a case where the skew detection function of the skew detection sensors 151, 152, 153, and 154 is temporarily disabled.

In step S1302, the CPU 111 displays a screen including the information for notifying the user of the occurrence of the skew of the document on the panel 401. More specifically, the CPU 111 displays the simple maintenance screen 801 on the panel 401, and advances the processing to step S1303.

In step S1303, the CPU 111 determines whether any event that triggers a shift of the display to the detailed maintenance screen 805 has occurred. More specifically, the CPU 111 advances the processing to step S1304 if the "SEE DETAILED PROCEDURE" key 804 in the screen 801 is pressed, and advances the processing to step S1305 if the key 804 is not pressed.

In step S1304, the CPU 111 displays the detailed maintenance screen 805 on the panel 401. The processing then proceeds to step S1305. In a case where an animation or a moving image is displayed in the area 806, the CPU 111 updates the area 806 displayed on the panel 401 at predetermined intervals (e.g., 30 frame-per-second (FPS)). In addition, the information to be displayed in step S1304 can be changed as appropriate. For example, the CPU 111 acquires output values of various sensors, such as the document detection sensor 145 and the conveyance sensors 146. The CPU 111 then estimates a location of a document jam based on the acquired output values. Subsequently, the CPU 111 may display the method for removing the document based on the estimated location.

In step S1305, the CPU 111 determines whether the recovery from the conveyance error has been completed. More specifically, the CPU 111 controls the reading unit 118 and acquires output values of the plurality of conveyance sensors 146. If the CPU 111 determines that no document is detected by any conveyance sensors 146 based on the acquired values, the CPU 111 determines that the recovery has been completed (YES in step S1305). The processing then proceeds to step S1306. If the CPU 111 determines that documents are detected by any one of the conveyance sensors 146, the CPU 111 determines that the recovery has not been completed (NO in step S1305). The processing then returns to step S1303. The CPU 111 updates the screen displayed on the panel 401 as necessary.

In addition, in step S1305, the CPU 111 may determine that the recovery has been completed if the closing of the cover 250 is further detected by the opening/closing sensor (not illustrated). In such a case, the CPU 111 advances the processing to step S1306 in a case where the closing of the cover 250 is detected by the opening/closing sensor in a state where the document is not detected by the conveyance sensors 146.

In step S1306, the CPU 111 displays, on the panel 401, the re-reading standby screen (i.e., screen 810) which includes the information for notifying the user of the occurrence of a skew of the document and the information for preventing the reoccurrence of a skew. The processing then proceeds to step S1307. In step S1307, if the CPU 111 determines that the stop key 815 is pressed (YES in step S1307), the processing proceeds to step S1309. If the CPU 111 determines that the stop key 815 is not pressed (NO in step S1307), the processing proceeds to step S1308.

In step S1309, the CPU 111 sets a value of a flag indicating whether to restart reading (scanning) of the document image (hereinafter, referred to as "scanning restart flag") to "FALSE", and ends the series of recovery processing. In addition, the scanning restart flag is temporarily stored in the RAM 113. The processing then proceeds to step S1211 when the recovery processing is completed.

In step S1308, if the CPU 111 determines that the start key 412 is pressed (YES in step S1308), the processing then proceeds to step S1310. If the CPU 111 determines that the start key 412 is not pressed (NO in step S1308), the processing returns to step S1307. The CPU 111 then waits for the press of the key. In step S1310, the CPU 111 sets a value of the scanning restart flag to "TRUE" and ends the series of the recovery processing. The processing proceeds to step S1211 when the recovery processing is completed.

Next, the processing to be executed when the CPU 111 determines that the occurrence of a skew is not to be notified to the user (NO in step S1301) will be described. In step S1311, the CPU 111 displays the detailed maintenance screen 901 on the panel 401. The processing then proceeds to step S1312. In a case where an animation or a moving image is displayed in the area 902, the CPU 111 updates the area 902 displayed on the panel 401 at predetermined intervals (e.g., 30 FPS). In addition, the information to be displayed in step S1311 can be changed as appropriate. For example, the CPU 111 acquires the output values of various sensors such as the document detection sensor 145 and the conveyance sensors 146. The CPU 111 then estimates a location of a document jam based on the acquired output values. Subsequently, the CPU 111 may display a method for removing the document based on the estimated location.

In step S1312, the CPU 111 determines whether recovery from the conveyance error has been completed. More specifically, the CPU 111 controls the reading unit 118 and acquires the output values of the plurality of conveyance sensors 146. If the CPU 111 determines that the document is not detected by any conveyance sensors 146 based on the acquired values, the CPU 111 determines that recovery has been completed (YES in step S1312). The processing then proceeds to step S1313. If the CPU 111 determines that document is detected by any one of the conveyance sensors 146, the CPU 111 determines that the recovery has not been completed (NO in step S1312). Thus, the processing returns to step S1311. The CPU 111 then updates the screen displayed on the panel 401 as necessary.

In addition, in step S1312, the CPU 111 may determine that the recovery has been completed if the closing of the cover 250 is further detected by the opening/closing sensor (not illustrated). In such a case, the CPU 111 advances the processing to step S1313 if the closing of the cover 250 is detected by the opening/closing sensor in a case where the document is not detected by the conveyance sensors 146.

In step S1313, the CPU 111 displays, on the panel 401, the rereading standby screen (i.e., screen 906) which does not include the information for notifying the user of the occurrence of a skew of the document and the information for preventing the reoccurrence of a skew. The processing then proceeds to step S1314. In step S1314, if the CPU 111 determines that the stop key 908 is pressed (YES in step S1314), the processing proceeds to step S1316. If the CPU 111 determines that the stop key 908 is not pressed (NO in step S1314), the processing proceeds to step S1315.

In step S1316, the CPU 111 sets the value of the scanning restart flag to "FALSE" and ends the series of the recovery processing. The processing proceeds to step S1211 when the recovery processing is completed.

In step S1315, if the CPU 111 determines that the start key 412 is pressed (YES in step S1315), the processing proceeds to step S1317. If the CPU 111 determines that the start key 412 is not pressed (NO in step S1315), the processing returns to step S1314. In step S1314, the CPU 111 waits for the press of the key. In step S1317, the CPU 111 sets the value of the scanning restart flag to "TRUE" and ends the series of recovery processing. The processing proceeds to step S1211 when the recovery processing is completed.

As described above, when the scanning processing is completed after the series of the scanning processing in step S1200 and the recovery processing in S1300 for a case of the occurrence of the conveyance error in the scanning processing, the processing proceeds to step S1103 of FIG. 11.

Referring back to FIG. 11, in step S1103, the CPU 111 refers to a value of the scanning end flag. If the value is "TRUE" (YES in step S1103), the processing proceeds to the printing processing in step S1104. If a referred value of the scanning end flag is "FALSE" (NO in step S1103), the processing in step S1104 is skipped. The processing then proceeds to step S1105.

In step S1104, the CPU 111 transfers the image data saved in the storage 114 in step S1206 to the printing unit 120. The CPU 111 controls the printing unit 120 and prints an image on a sheet. When the printing of the image data saved in the storage 114 is completed in step S1206, the processing proceeds to step S1105.

In step S1105, the CPU 111 deletes the image data saved in the storage 114 in step S1206 and ends the copying processing.

Through the above-described series of processing, the MFP 101 according to the present exemplary embodiment receives an execution instruction for a copy job and executes the received copy job.

According to the present exemplary embodiment, in a case where the operation of conveying documents is stopped because a skew is detected, the user can restart the operation for reading the images of the document after checking the method for the case of a skew and the method for the case where bound documents or mixed widths documents are placed on the ADF, as described above.

According to the present exemplary embodiment, a method for removing a document can also be notified to the user in a case where a skew is detected. Thus, in a case where a skew of a document is detected by the skew detection sensors, the user can remove the document while checking a method for opening a cover or a method for removing a document jammed in or stopped at the conveyance path.

The CPU 111 can control whether the notifying of the occurrence of a skew to a user is executed. For example, in a case where a document jam occurs in a state where a skew is not detected, i.e., in a case where the cause of the conveyance error is not the occurrence of a skew, the CPU 111 can display a maintenance screen displaying a method for removing the document without the information for preventing the reoccurrence of a skew displayed. In a case where the setting of the different-width mixed document size is enabled or the skew detection function of the skew detection sensors is temporarily disabled, the CPU 111 can also display the maintenance screen presenting a method for removing the document without displaying the information for preventing an erroneous skew detection. Accordingly, the information for preventing the reoccurrence of a skew or the information for avoiding an erroneous skew detection can be displayed when necessary.

According to the first exemplary embodiment, while the reading control in the copy function has been described, the present exemplary embodiment is also applicable to other functions for reading a document. Specifically, the present exemplary embodiment is also applicable to a file transmitting function for transmitting a document scanned by the MFP 101 to an externa apparatus. Moreover, the present exemplary embodiment is also applicable to a saving function for saving a document scanned by the MFP 101 in a saving area readable and writable by the MFP 101.

The present exemplary embodiment is also applicable to a case where the PC 102 provides a scanning instruction to a single-function scanner to cause the scanner to scan a document, and stores the scanned image in a saving area of the PC 102. In such a case, a control program of the PC 102 (e.g., scanner driver) and a reading control program of the single-function scanner cooperatively perform the above-described control. It is assumed that the single-function scanner includes constituent elements necessary for reading a document and exchanging data with the PC 102, from among the constituent elements illustrated in FIGS. 1, 3, and 4. The shape and the external view of the conveyance path for feeding and reading a document may be changed as appropriate.

Figure 14:
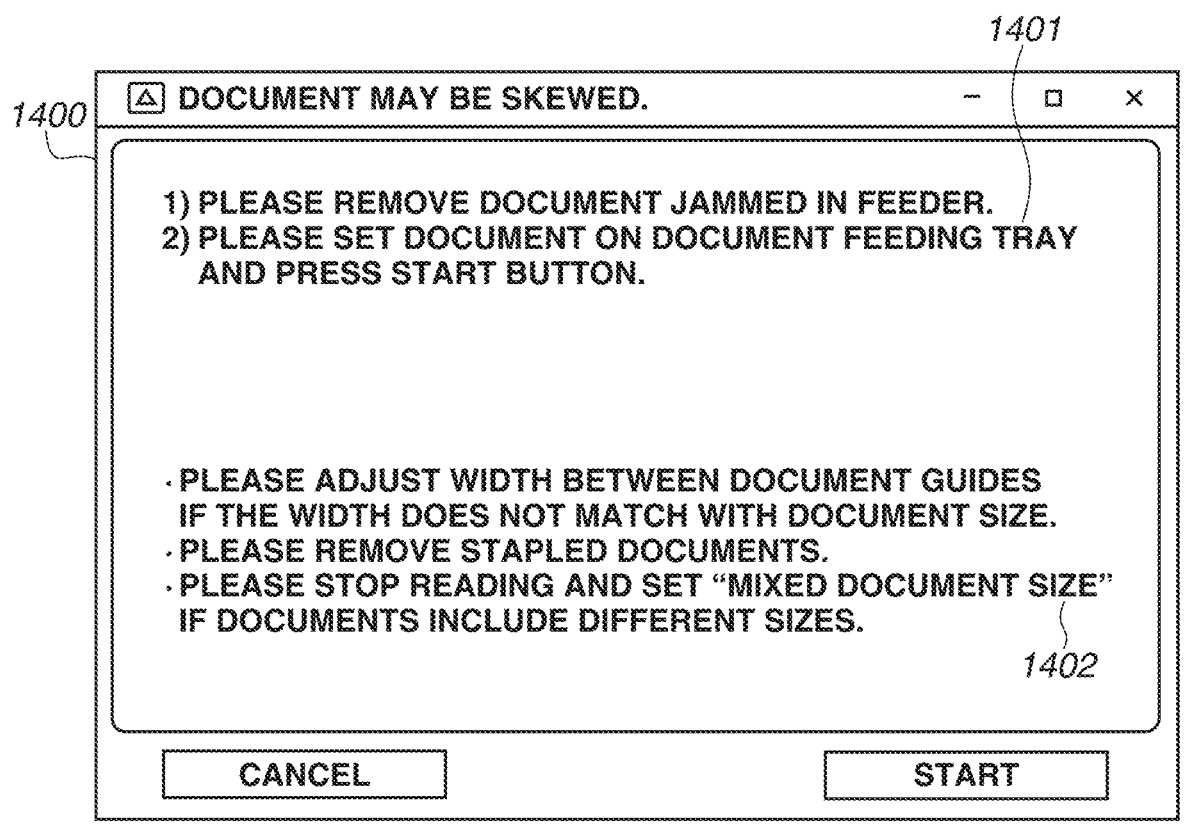
FIG. 14 is a diagram illustrating a screen displayed on an operation unit of a personal computer (PC).

In a case where the present exemplary embodiment is applied to the single-function scanner, a notification of a skew or a document jam may be provided on an operation unit (not illustrated) of the PC 102. For example, the PC 102 receives the information about the occurrence of a skew from the MFP 101 and displays a screen relating to a document jam or a skew as illustrated in FIG. 14 on the operation unit of the PC 102.

A screen 1400 illustrates an example of a window displayed on the operation unit of the PC 102. Information 1401 notifies the user that a document has to be removed. The information 1402 notifies the user that the width between the regulation plates 231 and 232 has to be adjusted to that of the document in order to prevent the reoccurrence of a skew as a handling method for a skew of a document. The information 1402 also notifies the user that stapled documents have to be removed from a bundle of documents in order to prevent the reoccurrence of a skew as a handling method for bound documents placed on the ADF. The information 1402 further notifies the user that the user has to stop rereading operation of the documents and to execute setting of the different-width mixed document size in order to avoid an erroneous skew detection as a handling method for mixed documents having different widths placed on the ADF.

As described above, the disclosure is applicable to an image reading apparatus capable of detecting a skew of a document and a system that includes the image reading apparatus.

As illustrated in FIG. 2, the first exemplary embodiment has been described based on the assumption that hard keys are used as the start key 412 and the stop key. However, the present exemplary embodiment is not limited thereto, and the keys or a part of the keys described as hard keys in FIG. 2 may be provided as a soft key displayed on the panel 401.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A system comprising:
   at least one processor; and
   at least one memory coupled to the at least one processor storing instructions that, when executed by the at least one processor, cause the at least one processor to function as:
   a processing unit configured to process data acquired as a result of reading performed on a document conveyed by at least one conveyor;
   a detection unit configured to detect a skew of a document conveyed by the at least one conveyor based on output from at least one sensor; and
   a display control unit configured to perform control to display, on a specific screen which is displayed in a case where the skew is detected by the detection unit, a specific display item for receiving an instruction to set a specific setting state in which the skew is not detected by the detection unit.

2. The system according to claim 1, wherein, based on an operation on a specific setting item displayed on a setting screen different from the specific screen, the system is allowed to make a setting so that the skew is not detected by the detection unit.

3. The system according to claim 1, wherein the display control unit is further configured to perform control to display, on the specific screen, a notification for prompting a user to make a setting of a predetermined setting state in which the skew is not detected by the detection unit, as a setting state of a specific setting item changeable through a setting screen different from the specific screen.

4. The system according to claim 3, wherein the setting screen is a screen capable of receiving operation to change a setting for a plurality of setting items.

5. The system according to claim 4, wherein the setting screen is a screen capable of receiving operation to change a setting for a plurality of setting items each related to copy processing.

6. The system according to claim 5, wherein the setting screen is a screen that is displayed based on operation on an item corresponding to a copy function among a group of items in a function selection screen on which the group of items, each for activating a corresponding one of a plurality of functions equipped in the system, is displayed in a selectable manner.

7. The system according to claim 1, wherein the display control unit is further configured to perform control to display staple-related information as a method for handling on the specific screen.

8. The system according to claim 1, further comprising:
   the at least one conveyor;
   a scanner configured to read a document conveyed by the at least one conveyor; and
   the at least one sensor.

9. The system according to claim 1, wherein the specific screen is displayed in a case where conveyance of a document by the at least one conveyor is stopped due to occurrence of a conveyance error.

10. The system according to claim 9, wherein the specific screen is displayed in a case where recovery from the conveyance error is performed.

11. The system according to claim 1, wherein the at least one sensor includes a plurality of sensors arranged on a line intersecting with a direction in which the at least one conveyor conveys a document.

12. The system according to claim 1, wherein, in a case where the specific setting state is set, the display control unit performs control so that the specific screen is not displayed, even in a document conveyance condition in which the detection unit would detect a skew of a document conveyed by the at least one conveyor unless the specific setting state being set.

13. The system according to claim 1, wherein the display control unit performs control so that, in a case where the specific setting state is not set and the skew is detected by the detection unit, a display indicating a possibility that the skew has occurred is displayed.

14. The method comprising:
   performing processing data acquired as a result of reading performed on a document conveyed by at least one conveyor;
   detecting a skew of a document conveyed by the at least one conveyor based on output from at least one sensor; and
   performing control to display, on a specific screen which is displayed in a case where the skew is detected by the detecting, a specific display item for receiving an instruction to set a specific setting state in which the skew is not detected by the detecting.

15. A non-transitory computer-readable memory storing a program for executing a method, the method comprising:
performing processing data acquired as a result of reading performed on a document conveyed by at least one conveyor;
detecting a skew of a document conveyed by the at least one conveyor based on output from at least one sensor; and
performing control to display, on a specific screen which is displayed in a case where the skew is detected by the detecting, a specific display item for receiving an instruction to set a specific setting state in which the skew is not detected by the detecting.

16. A system comprising:
at least one processor; and
at least one memory coupled to the at least one processor storing instructions that, when executed by the at least one processor, cause the at least one processor to function as:
a processing unit configured to process data acquired as a result of reading performed on a document conveyed by at least one conveyor;
a detection unit configured to detect a skew of a document conveyed by the at least one conveyor based on output from at least one sensor; and
a display control unit configured to perform control to display, on a specific screen which is displayed in a case where the skew is detected by the detection unit, a notification for prompting a user to make a setting of a predetermined setting state in which the skew is not detected by the detection unit, as a setting state of a specific setting item changeable through a setting screen.

17. The system according to claim 16, wherein the setting screen is a screen capable of receiving operation to change a setting for a plurality of setting items.

18. The system according to claim 17, wherein the setting screen is a screen capable of receiving operation to change a setting for a plurality of setting items each related to copy processing.

19. The system according to claim 18, wherein the setting screen is a screen that is displayed based on operation on an item corresponding to a copy function among a group of items in a function selection screen on which the group of items, each for activating a corresponding one of a plurality of functions equipped in the system, is displayed in a selectable manner.

20. The system according to claim 16, further comprising:
the at least one conveyor;
a scanner configured to read a document conveyed by the at least one conveyor; and
the at least one sensor.

21. The system according to claim 16, wherein the specific screen is displayed in a case where conveyance of a document by the at least one conveyor is stopped due to occurrence of a conveyance error.

22. The system according to claim 21, wherein the specific screen is displayed in a case where recovery from the conveyance error is performed.

23. The system according to claim 16, wherein the at least one sensor includes a plurality of sensors arranged on a line intersecting with a direction in which the at least one conveyor conveys a document.

24. The system according to claim 16, wherein, in a case where the predetermined setting state is set, the display control unit performs control so that the specific screen is not displayed, even in a document conveyance condition in which the detection unit would detect a skew of a document conveyed by the at least one conveyor unless the predetermined setting state being set.

25. The system according to claim 16, wherein the display control unit performs control so that, in a case where the predetermined setting state is not set and the skew is detected by the detection unit, a display indicating a possibility that the skew has occurred is displayed.

26. The method comprising:
performing processing data acquired as a result of reading performed on a document conveyed by at least one conveyor;
detecting a skew of a document conveyed by the at least one conveyor based on output from at least one sensor; and
performing control to display, on a specific screen which is displayed in a case where the skew is detected by the detecting, a notification for prompting a user to make a setting of a predetermined setting state in which the skew is not detected by the detecting, as a setting state of a specific setting item changeable through a setting screen.

27. A non-transitory computer-readable memory storing a program for executing a method, the method comprising:
performing processing data acquired as a result of reading performed on a document conveyed by at least one conveyor;
detecting a skew of a document conveyed by the at least one conveyor based on output from at least one sensor; and
performing control to display, on a specific screen which is displayed in a case where the skew is detected by the detecting, a notification for prompting a user to make a setting of a predetermined setting state in which the skew is not detected by the detecting, as a setting state of a specific setting item changeable through a setting screen.

28. A system comprising:
at least one processor; and
at least one memory coupled to the at least one processor storing instructions that, when executed by the at least one processor, cause the at least one processor to function as:
a processing unit configured to process data acquired as a result of reading performed on a document conveyed by at least one conveyor
a detection unit configured to detect a skew of a document conveyed by the at least one conveyor based on output from at least one sensor; and
a display control unit configured to perform control to display, on a specific screen which is displayed in a case where the skew is detected by the detection unit, staple-related information as a method for handling.

29. The method comprising:
performing processing data acquired as a result of reading performed on a document conveyed by at least one conveyor
detecting a skew of a document conveyed by the at least one conveyor based on output from at least one sensor; and performing control to display, on a specific screen which is displayed in a case where the skew is detected by the detecting, staple-related information as a method for handling.

30. A non-transitory computer-readable memory storing a program for executing a method, the method comprising:
performing processing data acquired as a result of reading performed on a document conveyed by at least one conveyor
detecting a skew of a document conveyed by the at least one conveyor based on output from at least one sensor; and
performing control to display, on a specific screen which is displayed in a case where the skew is detected by the detecting, staple-related information as a method for handling.

\* \* \* \* \*